(12) United States Patent
Eatherton et al.

(10) Patent No.: US 7,551,617 B2
(45) Date of Patent: Jun. 23, 2009

(54) MULTI-THREADED PACKET PROCESSING ARCHITECTURE WITH GLOBAL PACKET MEMORY, PACKET RECIRCULATION, AND COPROCESSOR

(75) Inventors: Will Eatherton, San Jose, CA (US); Earl T. Cohen, Fremont, CA (US); John Andrew Fingerhut, Mission Viejo, CA (US); Donald E. Steiss, Richardson, TX (US); John Williams, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 11/054,076

(22) Filed: Feb. 8, 2005

(65) Prior Publication Data

US 2006/0179156 A1    Aug. 10, 2006

(51) Int. Cl.
    *H04L 12/56*        (2006.01)
(52) U.S. Cl. .................................................... 370/392
(58) Field of Classification Search ........................ None
    See application file for complete search history.

(56) References Cited

U.S. PATENT DOCUMENTS

| | | | | |
|---|---|---|---|---|
| 4,866,701 A | * | 9/1989 | Giacopelli et al. | 370/411 |
| 5,247,629 A | * | 9/1993 | Casamatta et al. | 711/206 |
| 5,430,850 A | * | 7/1995 | Papadopoulos et al. | 719/314 |
| 5,845,129 A | * | 12/1998 | Wendorf et al. | 710/200 |
| 5,987,506 A | * | 11/1999 | Carter et al. | 709/213 |
| 6,601,138 B2 | * | 7/2003 | Otterness et al. | 711/114 |
| 6,947,425 B1 | * | 9/2005 | Hooper et al. | 370/394 |
| 7,100,020 B1 | * | 8/2006 | Brightman et al. | 712/18 |
| 7,210,022 B2 | * | 4/2007 | Jungck et al. | 712/34 |
| 2004/0037322 A1 | * | 2/2004 | Sukonik et al. | 370/476 |
| 2004/0039787 A1 | | 2/2004 | Zemach et al. | |

FOREIGN PATENT DOCUMENTS

WO    WO 2004/019571 A2    3/2004

* cited by examiner

*Primary Examiner*—Anh-Vu H. Ly
(74) *Attorney, Agent, or Firm*—Stolowitz Ford Cowger LLP

(57) ABSTRACT

A network processor has numerous novel features including a multi-threaded processor array, a multi-pass processing model, and Global Packet Memory (GPM) with hardware managed packet storage. These unique features allow the network processor to perform high-touch packet processing at high data rates. The packet processor can also be coded using a stack-based high-level programming language, such as C or C++. This allows quicker and higher quality porting of software features into the network processor.

Processor performance also does not severely drop off when additional processing features are added. For example, packets can be more intelligently processed by assigning processing elements to different bounded duration arrival processing tasks and variable duration main processing tasks. A recirculation path moves packets between the different arrival and main processing tasks. Other novel hardware features include a hardware architecture that efficiently intermixes co-processor operations with multi-threaded processing operations and improved cache affinity.

19 Claims, 19 Drawing Sheets

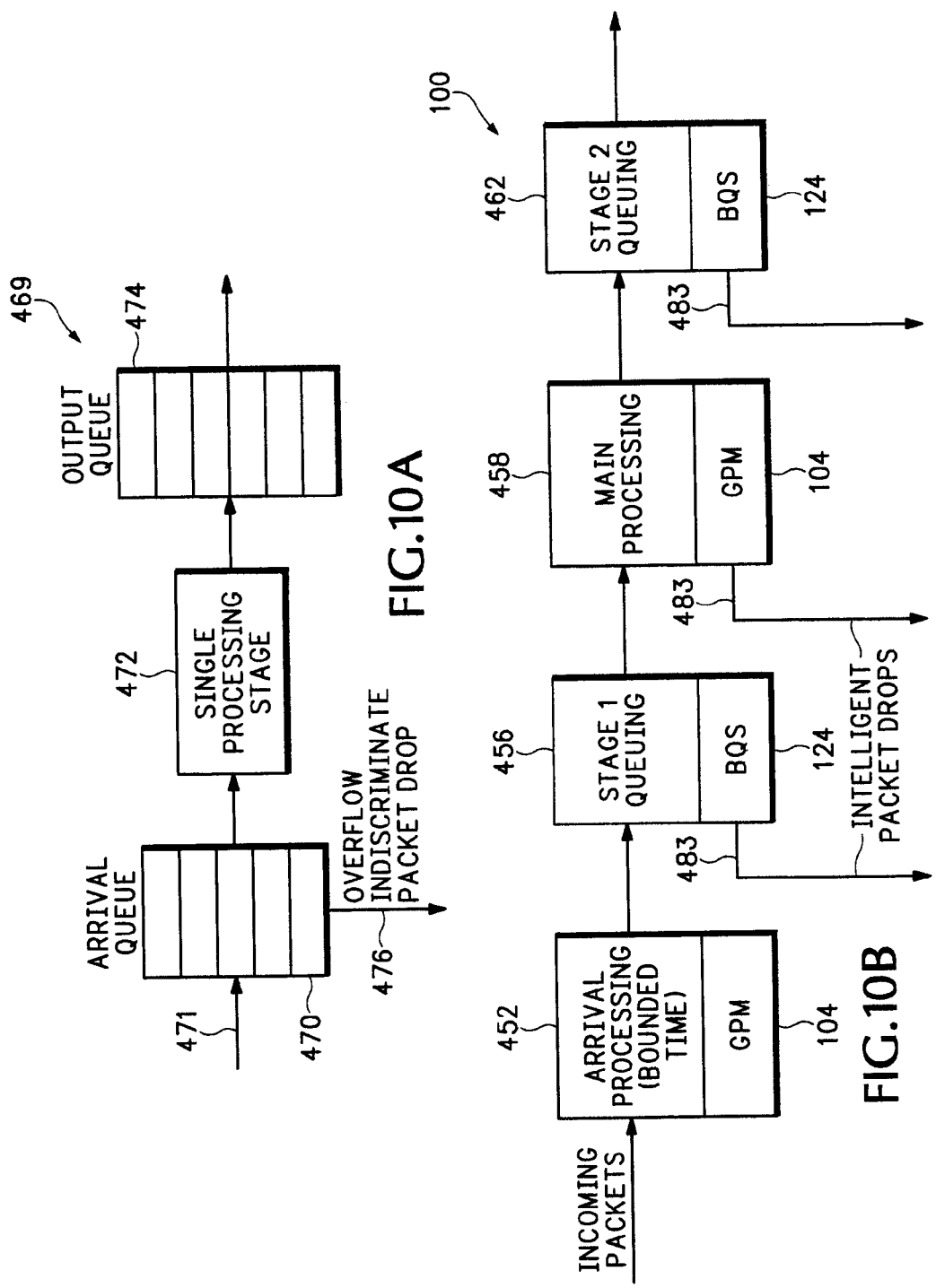

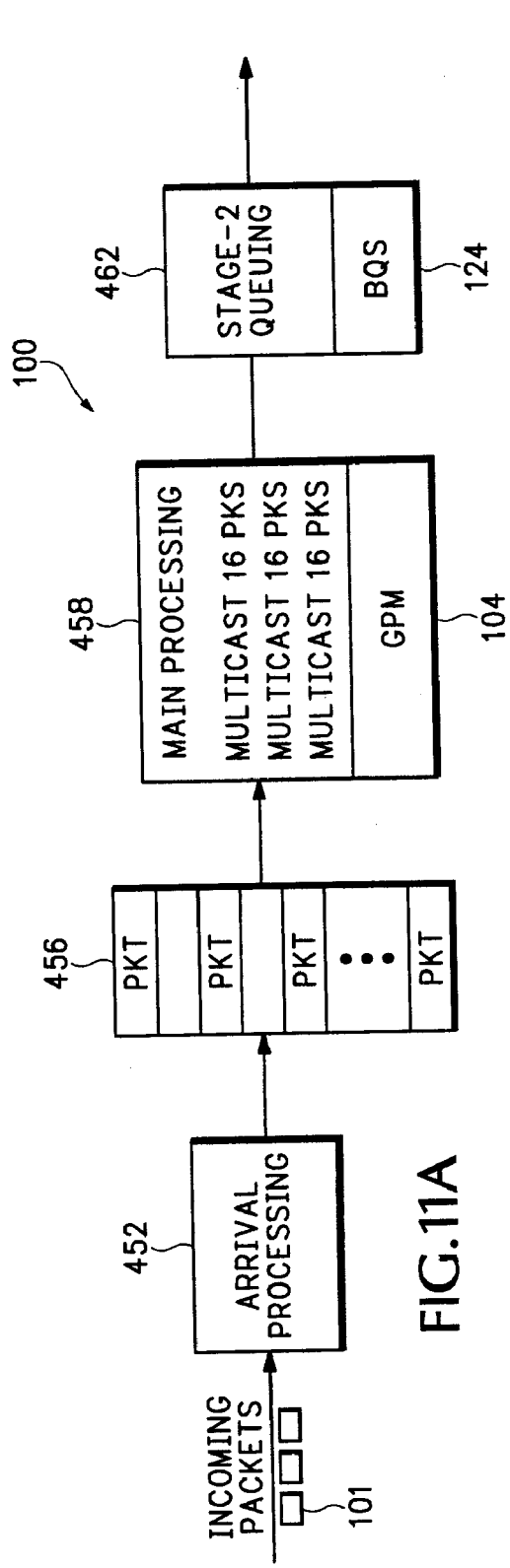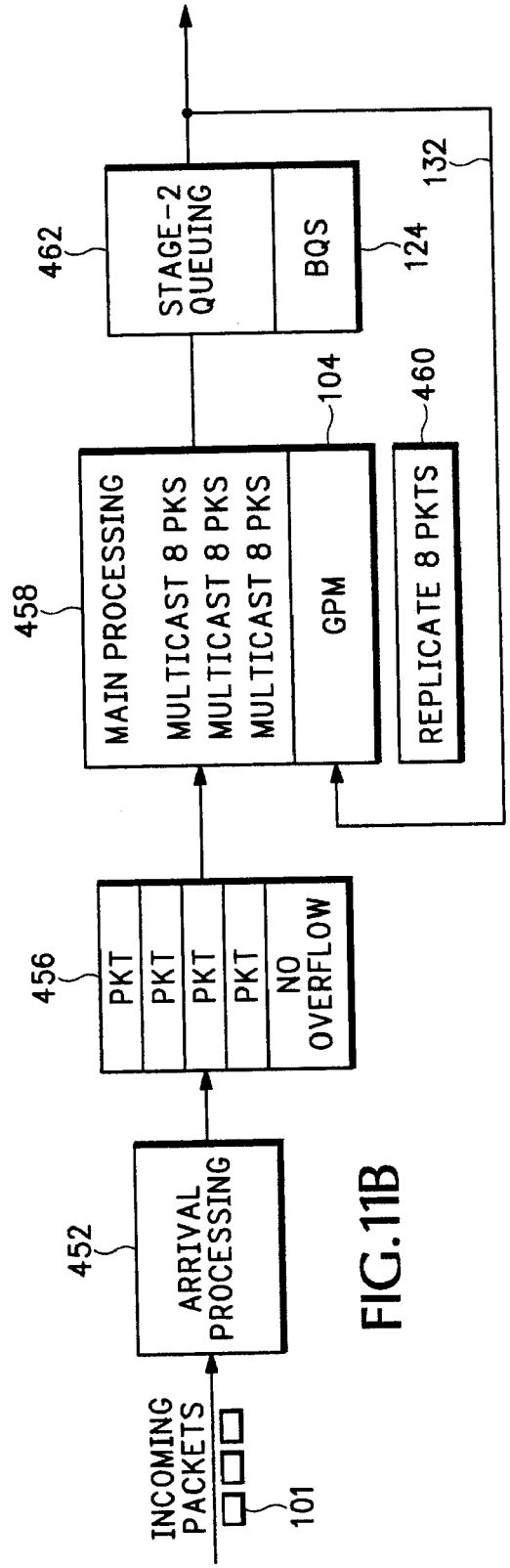

MULTI-THREADED PACKET PROCESSING ARCHITECTURE WITH GLOBAL PACKET MEMORY, PACKET RECIRCULATION, AND COPROCESSOR

TECHNICAL FIELD

One embodiment of the invention relates to communications and computer systems, especially routers, packet switching systems, and other network packet processing devices.

BACKGROUND

The communications industry is rapidly changing to adjust to emerging technologies and ever increasing customer demand. Demands for new network applications and higher performance is requiring communication networks to operate at faster speeds (e.g., higher bandwidth). Many communication providers are using packet switching technology to achieve these goals. For example, using packet switching and routing technologies that support the Internet Protocol (IP).

Network processors have been used in packet switched networks for several years and provide cost-effective "high touch" packet services at moderate to high packet processing rates. The network processors often have specialized microengines used for packet processing applications. However, network processors are generally difficult to program and particularly difficult to program with new features. The processors also often experience performance cliffs when additional software features are enabled.

Network processor architectures also exist that provide multiple processors on a single chip. These multi-processor devices may include packet processing assists and specialized interfaces. These multi-processor architectures are usually general purpose devices that can be coded in the C programming language. However, the generality of these architectures tend to limit their scalability and throughput.

Some network processors are restricted to a non-ANSI subset of the C programming language. Due to the lack of a clean stack model, these processors cannot be considered general purpose.

Other network processor architectures use a pipeline of processors, and may also include special hardware assists for packet processing and for other inter-processor communications. However, pipeline processor systems are often asymmetric meaning not all processors have equal access to all resources.

Therefore, a need exists for a network processor with increased packet processing capability, scalability and operating flexibility. The present invention addresses this and other problems associated with the prior art.

SUMMARY OF THE INVENTION

A network processor according to the invention has numerous novel features including a multi-threaded processor array, a multi-pass processing model, and Global Packet Memory (GPM) with hardware managed packet storage. These unique features allow the network processor to perform high-touch packet processing at high data rates. The network processor can also be coded using a stack-based high-level programming language, such as C or C++. This allows quicker and higher quality porting of software features into the network processor.

Processor performance also does not severely drop off when additional processing features are added. For example, packets can be more intelligently processed by assigning processing elements to different bounded duration arrival processing tasks and variable duration main processing tasks. A recirculation path moves packets between the different arrival and main processing tasks. Other novel hardware features include a hardware architecture that efficiently intermixes co-processor operations with multi-threaded processing operations and improved cache affinity.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 10A, 10B, 11A, and 11B show how the packet processor more intelligently processes packets using recirculation.

DETAILED DESCRIPTION

Overview

Figure 1:
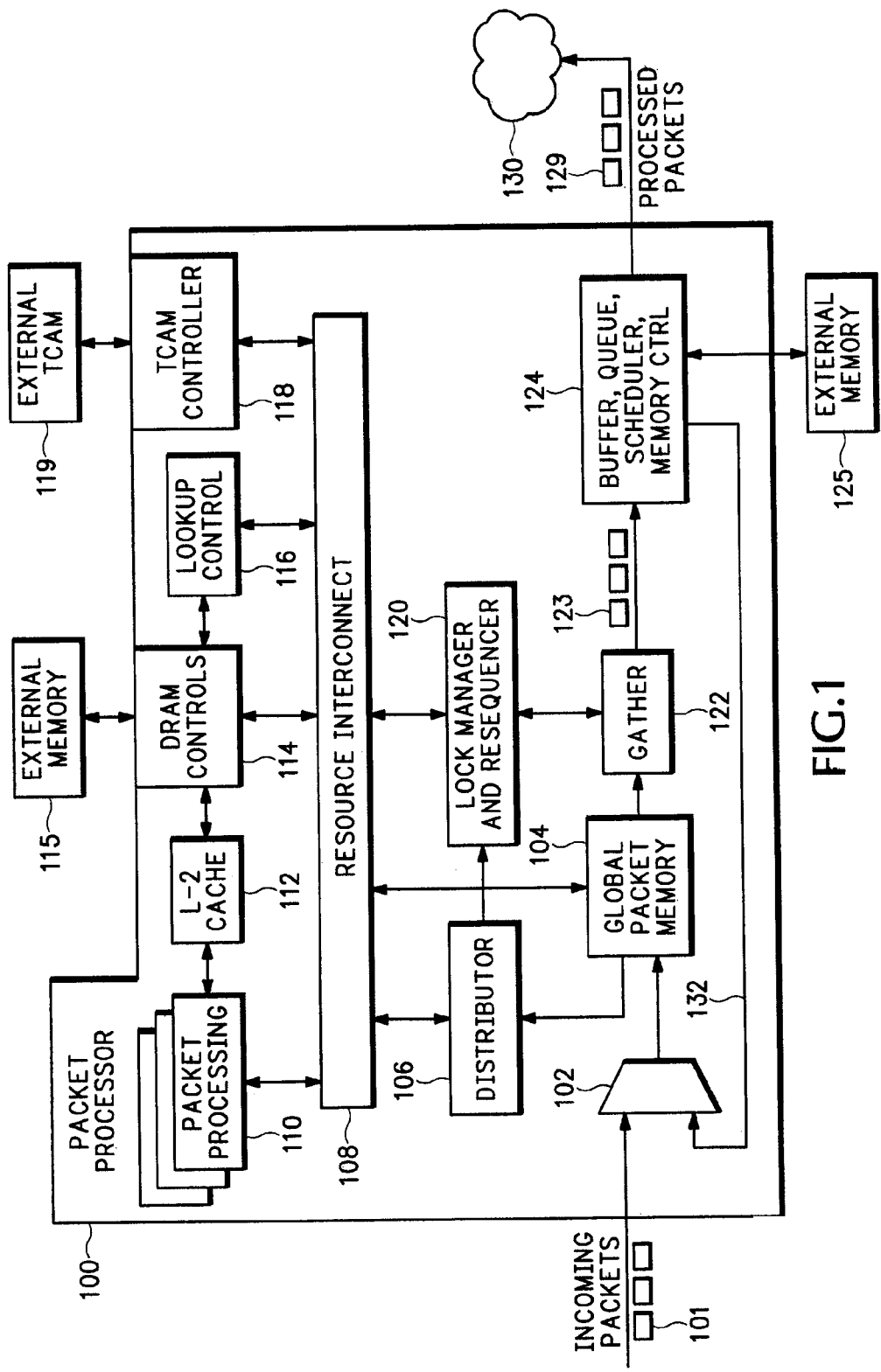
FIG. 1 is a block diagram of a multi-threaded packet processor.

FIG. 1 is a block diagram of a multi-threaded network processor 100. Packets 101 are received by the packet processor 100 and typically stored in a Global Packet Memory (GPM) 104 via a multiplexer 102. After a packet is received, the GPM 104 builds an associated packet handle data structure (FIG. 5) and then enqueues the packet on a flow lock queue operated by a lock manager and resequencer 120. After receiving a reply back from the lock manager 120, the GPM 104 directs a distributor 106 to allocate the packet 101 to Packet Processing Elements (PPEs) 110.

The PPEs 110 process the packets in the GPM 104 through a resource interconnect 108. The PPEs 110 may also use a Level-2 (L2) cache 112, Dynamic Random Access Memory (DRAM) controls 114, and lookup control 116 to access external memory 115. An external Ternary Content Addressable Memory (TCAM) 119 is also accessible by the PPEs 110 through the resource interconnect 108 and a TCAM controller 118. In one embodiment, the PPEs 110 are multi-threaded. However, some of the features described below can be performed by any generic processing unit with or without multi-threaded capability.

The PPEs 110 inform the lock manager 120 when they have completed processing a packet. The PPEs 110 are then free to start processing other packets. After being processed by the PPEs 110, the packets continue to reside in the GPM 104 and may be stored in GPM 104 in a scattered non-contiguous fashion. A gather mechanism 122 is responsible for gathering and assembling the scattered portions of the packet back together. The lock manager 120 works with the gather mechanism 122 to determine the final order that the assembled packets 123 are sent from the GPM 104 to a Buffer, Queue, Scheduler (BQS) memory controller 124. The BQS 124 queues, schedules, and de-queues packets offloading this time-consuming task from the PPEs 110. An external memory 125 is used by the BQS 124 as a packet buffer for, among other things, storing packets between different arrival and main processing operations. A recirculation path 132 is used by the BQS 124 to recirculate packets back to the GPM 104 for further processing by the PPEs 110.

Various specialized packet processing assists, such as a Forwarding Information dataBase (FIB) look-up, the TCAM access controller 118, atomic operations to memory, policers, Weighted Random Early Detection (WRED), hashing and modulus, etc. also enable the packet processor 100 to provide increased performance levels. Packet processing assists can also provide hardware atomic updates of known data structures in order to allow high performance updates to structures that represent large bandwidth flow through the network processor.

Resources in the packet processor 100 refer to any of the different functional elements that can be accessed by the PPEs 110. For example, the L-2 cache 112, external memory 115, external TCAM 119, GPM 104, co-processor 634 (FIG. 15), etc. are all considered resources.

Figure 2:
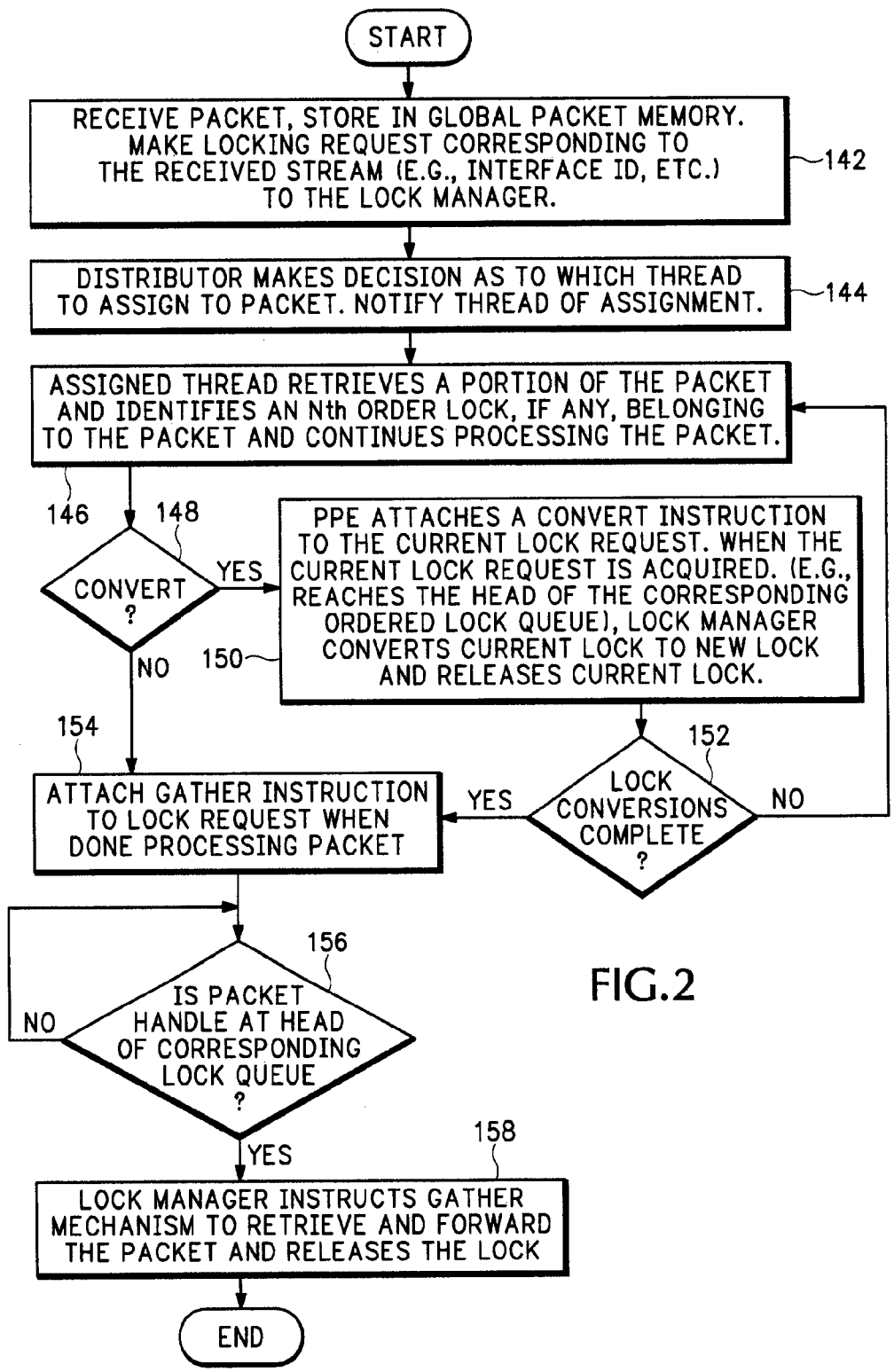
FIG. 2 is a flow diagram describing some of the operations for the packet processor in FIG. 1.

FIG. 2 describes in more detail the general operation for one embodiment of packet processor 100. In block 142, a packet 101 is received and stored in GPM 104. After the packet is received, the GPM 104 makes a lock request corresponding with a stream which the packet belongs, such as the interface over which the packet was received. In another embodiment, the stream may be identified based on the packet contents.

In block 144, the distributor 106 identifies a thread for allocating to the packet. After the lock request is acknowledged back to the GPM 104, the distributor 106 notifies the thread of the packet assignment. In block 146, the assigned thread retrieves the relevant portion (e.g., header and possibly other fields) of the packet from the GPM 104, and processes this and/or other information to identify a flow/lock, if any, associated with the packet. The thread then continues processing the packet.

As determined in decision block 148, if a convert operation is to be performed, the thread in block 150 associates/attaches a convert instruction to a current lock request. When the current lock request is acquired, such as when the corresponding conversion identifier reaches the head of a corresponding lock queue, the lock manager 120 performs (or causes another mechanism to perform) instructions that convert the current lock to a new lock and then releases the current lock. Block 152 repeats the operations in block 150 if additional lock conversions are required.

In block 154, the thread attaches a gather instruction to the lock request when the thread completes processing the packet. In decision block 156, the lock manager 120 waits for a packet handle associated with the packet to reach the head of the lock queue. The lock manager 120 in block 158 then instructs the gather mechanism 122 to assemble and forward the assembled packet 123 (FIG. 1) to BQS 124. The lock manager 120 then releases the lock and the packet handle.

Figure 3:
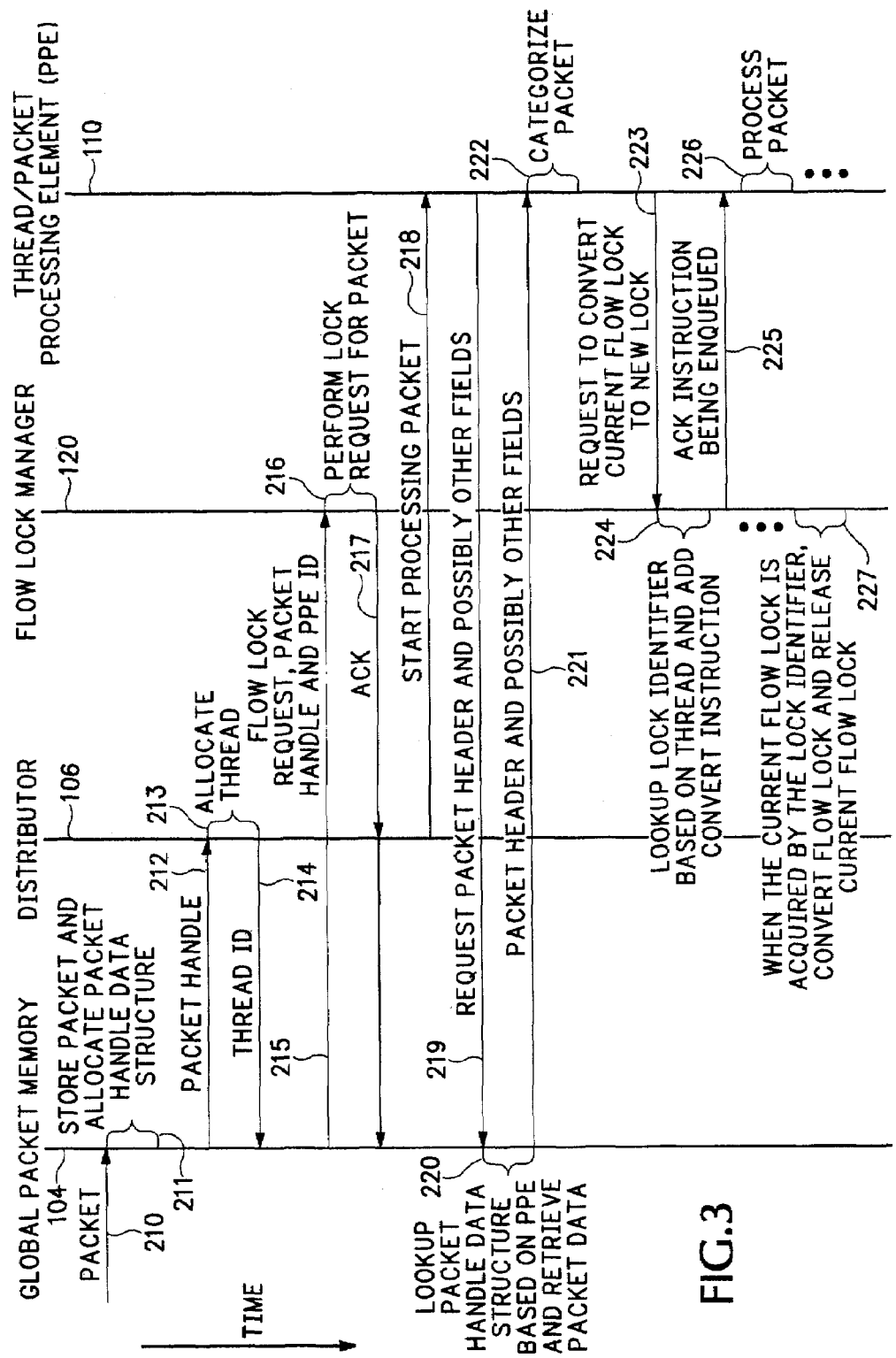
FIGS. 3 and 4 are diagrams showing communications between the processing elements in the packet processor.

FIG. 3 shows initial operations and messaging in the packet processor 100. Operations in this diagram go in a vertical order, starting from the top and moving toward the bottom. Multiple PPEs 110 typically process packets at the same time. The same PPE 110 may also be processing multiple packets at the same time using different threads. Thus, the order of some of the operations described below may vary depending on times required for identifiers to be acquired by a flow lock, packet processing operations, etc.

A particular packet is received (210) and stored (211) into GPM 104. A packet handle data structure is allocated that identifies where the actual packet data is stored in GPM 104. The packet handle data structure is described in further detail below in FIG. 5. The packet handle corresponding with the packet handle data structure is communicated (212) to the distributor 106. The distributor 106 allocates (213) a free thread if one is currently available, or does so after one becomes available, and identifies (214) the thread to the GPM 104.

In order to maintain the sequence of the received packets, the GPM 104 sends a flow lock request (215) to flow lock manager 120. The flow lock manager 120 performs (216) a lock request for the packet and notifies (217) the GPM 104, or possibly the distributor 106. After the lock request is acknowledged, the distributor 106 is then allowed to notify (218) the assigned thread to start processing the packet. In one embodiment, notification (218) also serves to acknowledge to a thread completion of processing for a previous packet. In another embodiment, the lock acknowledge 217 is sent to the GPM 104 which then directs the distributor 106 to notify the thread.

The thread requests (219) and receives (221) the packet header and possibly other fields and/or information corresponding to the packet from GPM 104. In one embodiment, GPM 104 retrieves (220) this information based on the packet handle and the thread ID described in FIG. 5.

Based on information received from the GPM 104, the thread categorizes (222) the packet to identify possibly additional locks to convert corresponding to the sub-stream. The thread submits (223) a conversion request to flow lock manager 120. The flow lock manager 120 identifies (224) the lock identifier corresponding to the packet and adds a conversion instruction. The flow lock manager 120 then acknowledges (225) to the thread that the conversion request has been added. The thread continues to process (226) the packet. When the current flow lock is acquired (227) by the lock identifier, its attached instructions are performed (227) which includes conversion to the new lock and release of the previous current lock. This is of course is only one example of one particular part of the processing that may be performed by the packet processor 100.

Figure 4:
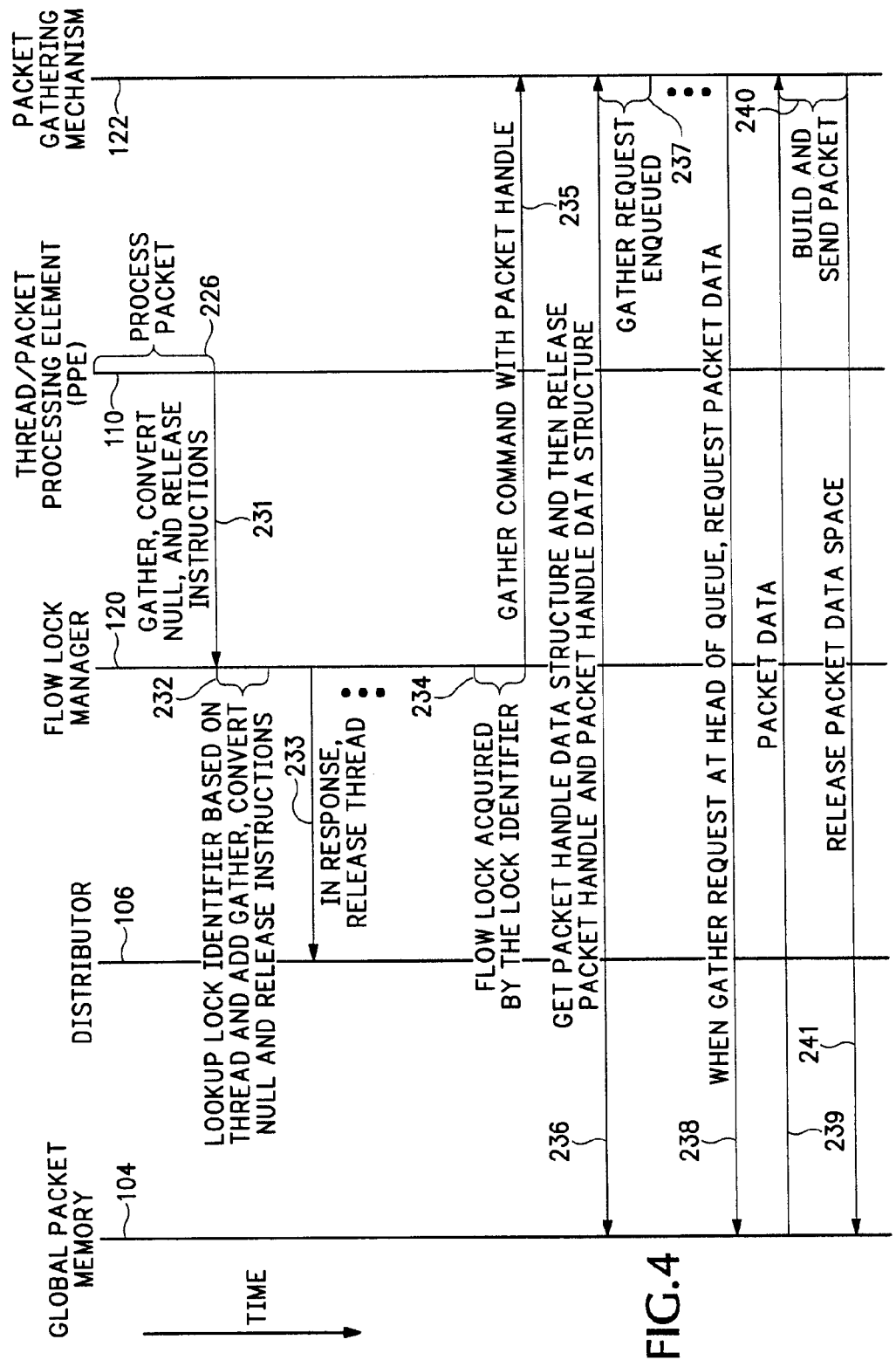

FIG. 4 shows one scenario which may be used to complete the processing of the packet, such as the operations used for gathering and sending the packets to the BQS 124 (FIG. 1). Processing (226) of the packet continues by the thread. After completing packet processing, the thread sends instructions (231) to flow lock manager 120, such as; packet gather, convert flow lock to null (i.e., don't convert it), and release flow lock. The flow lock manager 120 looks up (232) the flow lock identifier corresponding to the packet, and in response, notifies (233) distributor 106 to release the thread.

The distributor 106 releases the thread so it can start processing another packet. Depending on the traffic load, the thread may immediately be assigned another packet, assigned another packet before the just processed packet is built and/or sent (e.g., while the gather operation is performed), or assigned another packet after the currently processed packet is actually built and/or sent. Any subsequently assigned packets may be at the same or a different location in the GPM 104.

The thread may not get assigned an entirely new distributed packet. Alternatively, the thread may keep current packet data and generate a new packet from the current packet data for multicast or fragmentation operations.

When the lock identifier corresponding to the packet is acquired (234), flow lock manager 120 issues (235) a gather command to gather mechanism 122 that includes the packet handle corresponding to the packet. Gather mechanism 122 gets (e.g., requests and receives) a copy of the packet handle data structure and then releases (236) the packet handle and the packet handle data structure.

The gather request is enqueued (237) by gather mechanism 122. When the gather request is serviced (e.g., at the head of the gathering queue) the actual packet data is requested (238) and received (239) from GPM 104. The packet is then built and sent (240) to the BQS 124 and the packet data space is released (241) within GPM 104.

In one embodiment, a single gathering queue is used, while in another embodiment, multiple gathering queues are used. Typically multiple gathering queues will be distinguished by one or more characteristics, such as priority and/or type of traffic, Quality of Service (QoS), scheduling information, etc.

Figure 5:
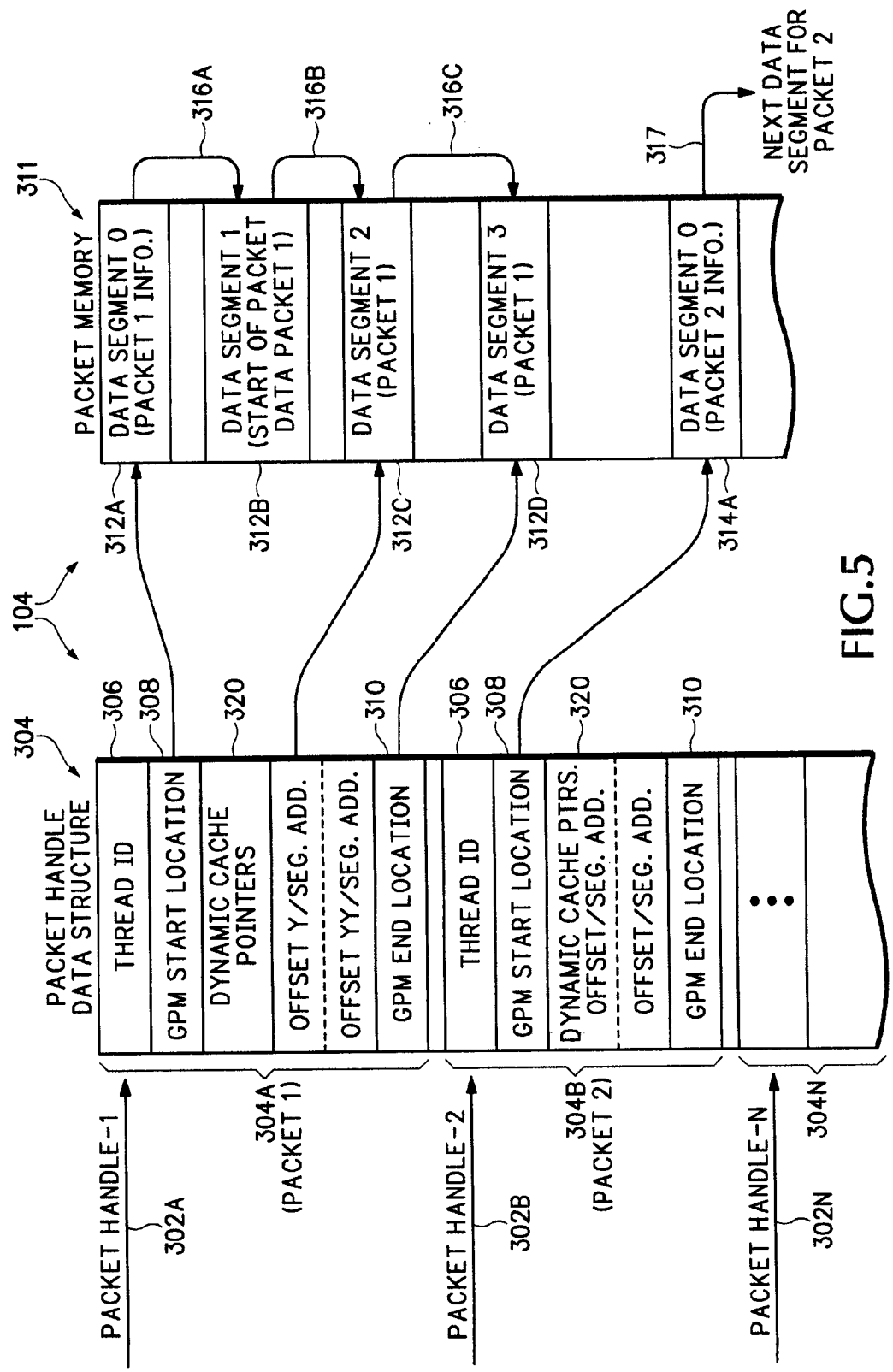
FIG. 5 is a data structure used by a global packet memory in the packet processor.

FIG. 5 shows one example of a data structure used in the GPM 104 for storing and identifying packet data. Packet handle data structures 304A-304N are typically accessed using packet handles 302A-302N, which may be pointers, offset values, or other reference or address values. In one embodiment, the packet handle data structures 304A-304N are used by the threads 402 (FIG. 6) to access different data segments 312 and 314 in packet memory 311. Some data segments 312 may contain actual packet data and other data segments 312 may contain control data associated with the packet.

The packet handle data structure 304 can vary among different embodiments, but typically includes descriptors such as a thread identifier (thread ID) 306 and one or more pointers 308 and 310. For example, a GPM start location pointer 308 points to a first data segment 312A associated with a particular packet (e.g., packet 1). The first data segment 312A might contain the control information for packet 1. A GPM end location pointer 310 points to a last data segment 312D for packet 1. Similarly, a second packet handle data structure 304B includes a thread ID 306 and pointers 308 and 310 that point to other data segments 314 in packet memory 311 associated with another packet (packet 2).

The data segments 312 associated with particular packets might be scattered at different non-contiguous locations in packet memory 311. A separate mapping table (not shown) may contain links 316 that link the different data segments 312 for the first packet to each other. The mapping table includes other links, such as link 317, that link together the data segments 314 for a different packet.

The packet handle data structures 304 can optionally include one or more dynamic cache pointers 320 that identify the most recently accessed data segments in packet memory 311. For example, an address offset Y in the packet handle 302A for packet 1 may have accessed a corresponding data segment 312C in the packet memory 311. The GPM 311 writes the offset value Y and the corresponding physical address for data segment 312C into one of the dynamic cache pointers 320 in packet handle data structure 304A.

A subsequent packet handle 302A may include an address offset that is close to address offset Y in dynamic cache pointer 320. The GPM 104 can then use dynamic cache pointer 320 to jump directly to data segment 312C. If the identified data segment 312C does not contain the packet data corresponding to the address offset in packet handle 302A, the GPM 104 can then start from pointer 316C to then link to the correct data segment 312. This is quicker than having to start from the first packet data segment 312A and then serially jump to each successive link 316 until the correct data segment 312 is located.

In one embodiment, the GPM 104 identifies the dynamic cache pointer 320 with the address offset value that is closest to, but also less than, the offset address value in the packet handle 302. The GPM 104 starts from the link pointer 316C for the identified data segment 312C to then link to the correct data segment.

In an alternative embodiment, the GPM 104 may include reverse pointers 312 and 314. In this embodiment, the GPM 104 may identify the dynamic cache pointer 320 that is absolutely closest to the offset value in the packet handle 302, regardless of whether the identified dynamic cache pointer 320 is above or below the packet handle value. The GPM 104 can then either jump forward or backward in the data segment order as necessary.

The packet handle data structures 304 and data segments 312 and 314 in packet memory 311 continue to reside in GPM 104 (tenure) even after the PPEs 110 have completed actively processing the packets. The packet handle data structures 304 and the associated data segments 312 and 314 typically remains valid in the GPM 110 until the packet data is transferred to the BQS 124 (FIG. 1). This allows resources, in addition to the PPEs 110, to perform tasks on the packet data in the GPM 104.

Symmetric Processing

Symmetric processing allows common software operating in the packet processor 100 to run any thread on any PPE 110. No processing specialization is required for any particular PPE 110 or thread. Thus, whenever a thread completes processing a packet, the thread can be assigned any new packet by the distributor 106 and perform any necessary packet processing task. Another important feature of the packet processor 100 is that the threads can complete processing on a packet, be assigned a new packet, and start processing the new packet without having to wait for the previously processed packet to be output to a network. For example, the threads do not have to wait for previously processed packets to be gathered and sent to the BQS 124 (FIG. 1) or wait for the packet to be output by the BQS 124 from the packet processor 100.

Figure 6:
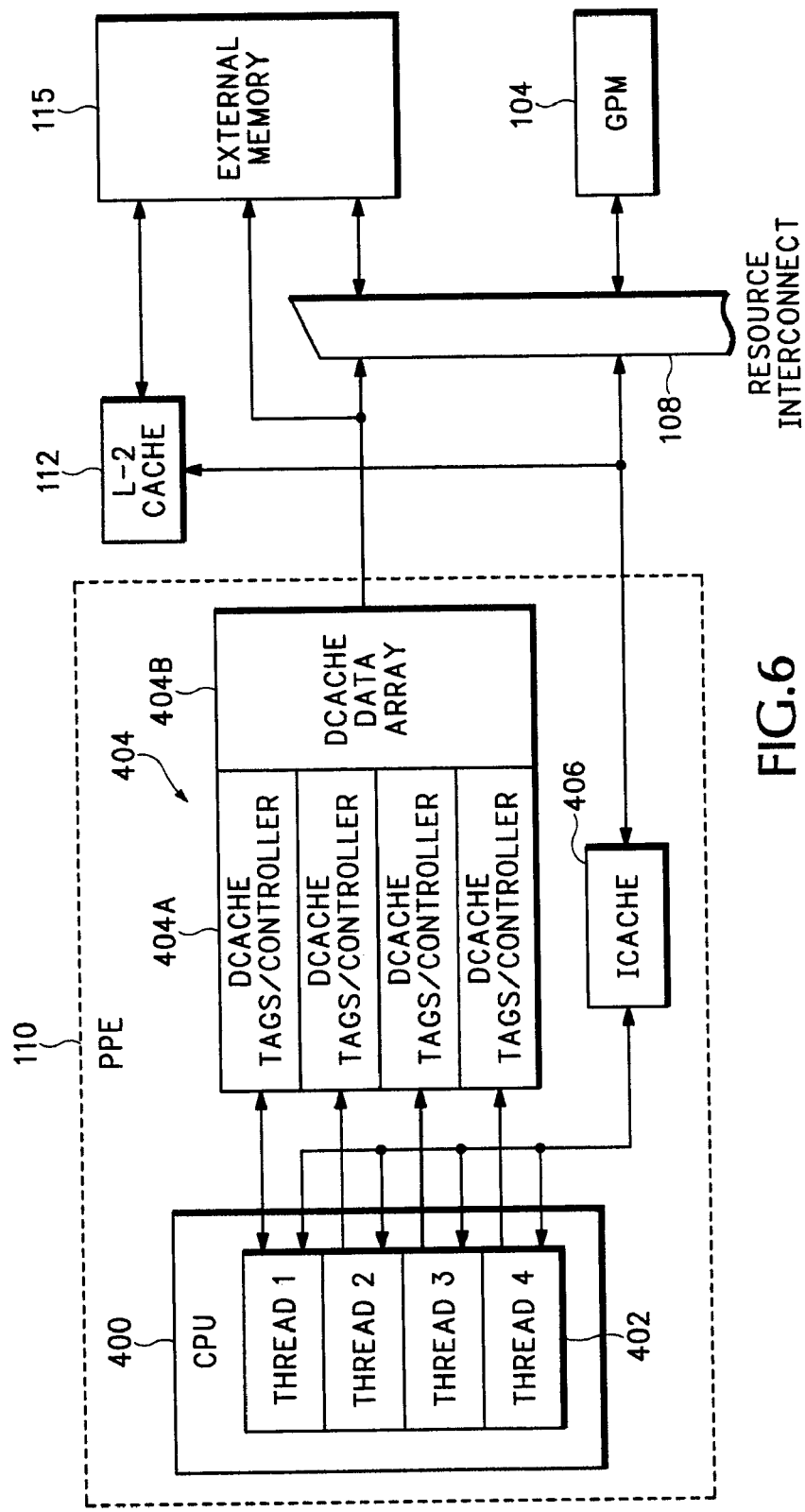
FIG. 6 is a detailed block diagram of a Packet Processing Element (PPE) used in the packet processor.

To explain further, FIG. 6 shows a more detailed diagram for one of the PPEs 110. A central processing unit 400 can operate multiple threads 402. In this embodiment, each thread 402 has associated data cache (DCACHE) tags and cache controllers 404A and share a DCACHE data array 404B. The threads also share a same instruction cache (ICACHE) 406. Other cache configurations are also possible where the threads 402 all access the same DCACHE 404 or each thread has an individual ICACHE 406. Both the DCACHE 404 and the ICACHE 406 can access external memory 115 and GPM 104 through the resource interconnect 108. In one embodiment, the ICACHE 112 may also access the external memory 115 through an L-2 cache 112 and the DCACHE may directly access external memory 115. Of course other memory configurations are also possible where the DCACHE 404 accesses external memory 115 through the L-2 cache 112 or the ICACHE 406 directly accesses external memory 115.

The multi-threaded PPEs 110 increase throughput by hiding latency waiting to access slow resources. The resource interconnect 108 provides all PPEs 110 uniform access to all resources shown in FIG. 1. Thus, all PPEs 110 and all threads 402 have equal capacity to perform any task on any packet. The PPEs 110 each support a stack model and have a Translation Look-aside Buffer (TLB) (FIG. 16) for memory mapping.

Figure 7:
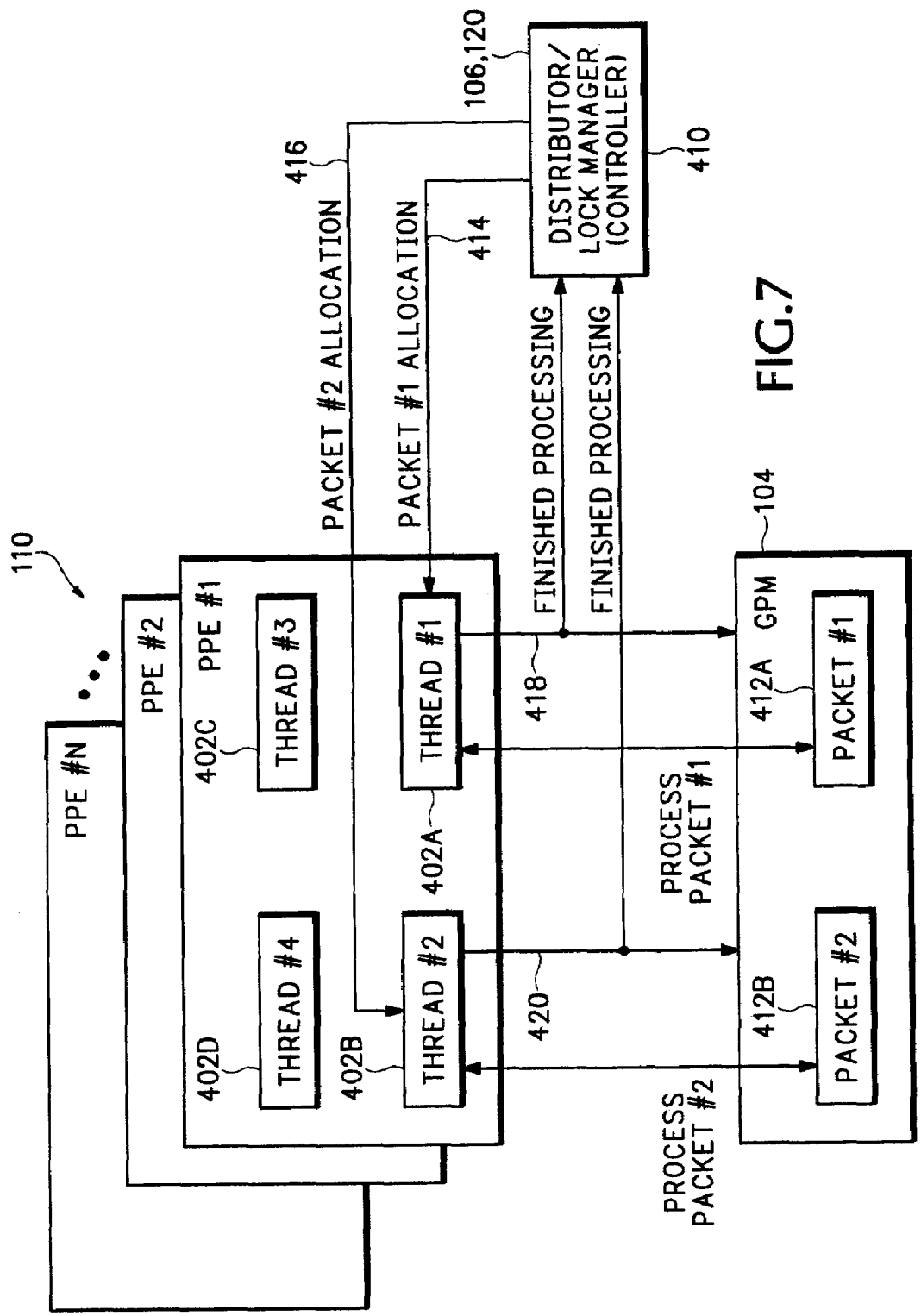
FIGS. 7 and 8 are block diagrams showing how different threads in the PPEs are allocated packets.

FIG. 7 shows an array of PPEs 110 each operating multiple threads 402. For simplicity, the distributor 106 and lock manager 120 are referred to generally below as a controller 410. Arriving packets are loaded into GPM 104 and are queued up waiting for a thread 402. The controller 403 sends an allocate message 414 directing thread 402A to start processing a first packet 412A. At the same time, or sometime during the processing of packet 412A, the controller 410 may send another allocate message 416 directing thread 402B to start processing another packet 412B.

When processing is completed on packet 412A, thread 402A sends notification 418 to the GPM 104 and controller 410. Similarly, when the processing is completed on the second packet 412B, thread 402B sends notification 420 back to the GPM 104 and controller 410. It should be understood that either thread 402A or thread 402B may complete processing on their allocated packet first. The packets 412A and 412B on the associated packet handle data structures 304 (FIG. 5) remain in GPM 104, if necessary, for other ordering, sequencing, or thread processing operations.

Figure 8:
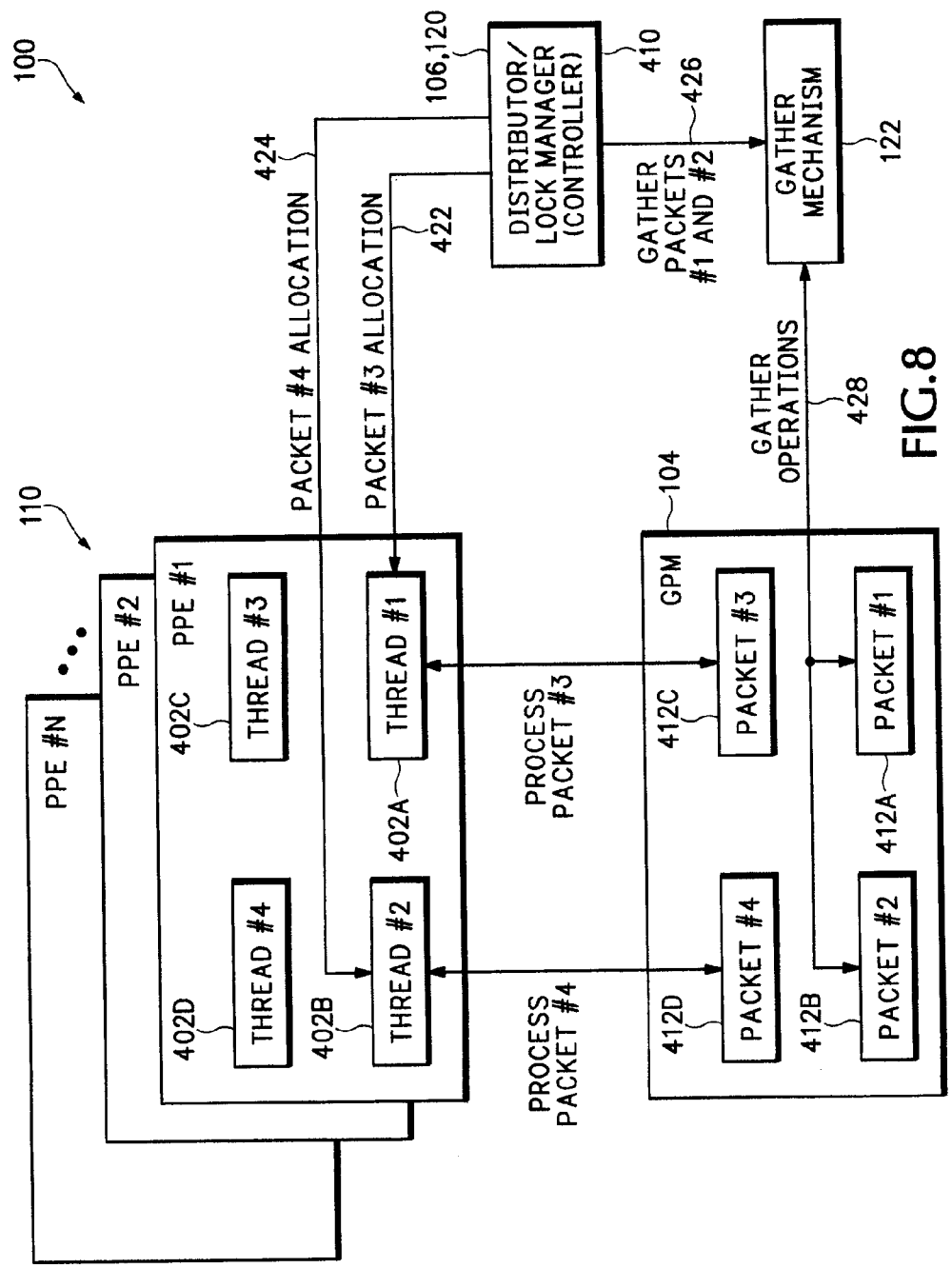

Referring to FIG. 8, after receiving either of the notifications 418 or 420 (FIG. 7) from threads 402A or 402B, respectively, and after a flow lock is acquired, the controller 410 sends gather instructions 426 to the gather mechanism 122 to begin gather operations on the packets 412A and/or 412B. At the same time, the controller 410 can also allocate other packets to threads 402A and/or 402B. For example, allocation instruction 422 directs thread 402A to start processing on a new packet 412C and allocation instruction 424 directs thread 402B to start processing on a new packet 412D.

In other network processing units with multiple threads, the lack of a flow lock mechanism prevents true symmetric parallelization of processing across threads and requires pipelining, or results in underutilization of processing resources. However, a PPE 110 and threads 402 in packet processor 100 can start processing new packets immediately after notifying the lock manager 120 processing is finished on a previous packet. This allows the PPEs 110 and associated threads to start processing other packets while a previously processed packet is still being queued and gathered in the GPM 104 or while the packet is still being queued in the BQS 124. Thus, the PPEs 110 and threads 402 are only limited by the amount of time required to actually process a packet and do not have to wait for packets to be scheduled or complete input or output queuing.

Packet Recirculation

Referring briefly back to FIG. 1, the amount of time required to process packets can vary. For example, packets can arrive as fragments or arrive out of order on different links. The packets or packet fragments 101 may have to be buffered while waiting for other packets or packet fragments to arrive. The amount of time required to process a packet after it does all arrive can also vary depending on what feature set is enabled. For example, different processing features, such as security processing or QoS processing may require different amounts of processing time.

Large latency periods during this variable time processing can create backups in packet queues and eventually cause packet drops. Some of the dropped packets may be control packets used for maintaining network links. Other dropped packets might affect packet prioritization. For example, some of the dropped packets may have higher quality of service values than other packets. Unfortunately, the arriving packets may be indiscriminately dropped before the packet processor has a chance to take into account associated control or QoS information.

Some of these problems are eliminated, reduced or streamlined by the recirculation path 132 in FIG. 1. This multi-pass processing feature supports a deterministic "arrival processing" pass that performs upfront time-bounded packet processing operations. A second "main processing" pass can then be performed for variable run time, high touch processing. This multi-pass processing also enhances other operations, such providing more sophisticated re-assembly, multi-cast, etc.

Figure 9A:
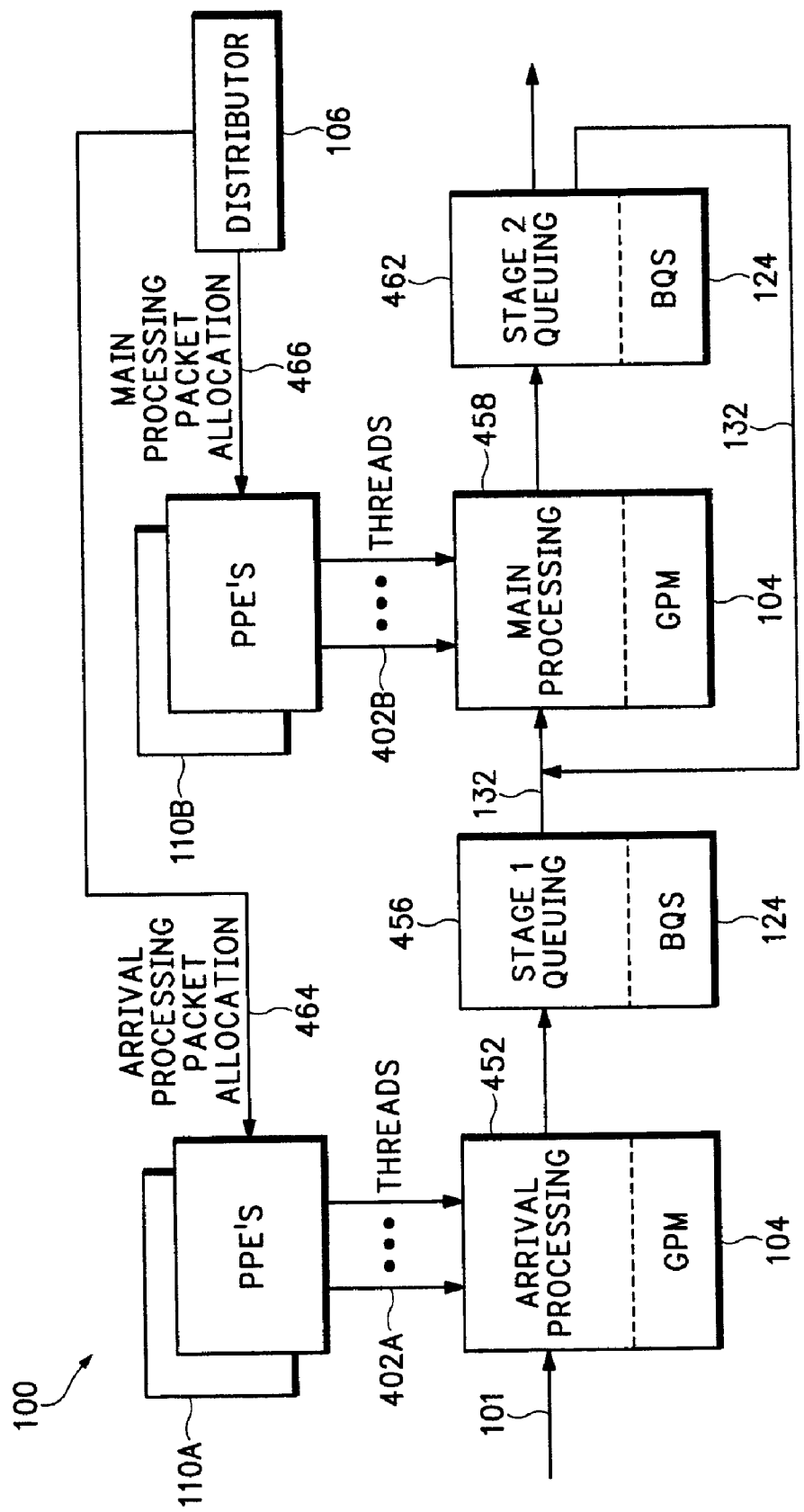
FIGS. 9A and 9B are diagrams showing how arrival and main packet processing tasks are allocated to different threads.

To explain further, FIG. 9A shows overall PPE packet processing broken up into arrival processing 452 and main processing 458. The arrival processing 452 can be limited to some relatively bounded-time processing effort while the main processing 458 can perform the variable-time "high touch" processing operations. The packets are stored in the GPM 104 during the arrival processing 452 and main processing 458. The stage-1 queuing 456 and the stage-2 queuing are provided by the BQS 124. For example, stage-1 queuing 456 in the BQS 124 sends packets back to the GPM 104 after completing arrival processing 452. Stage-2 queuing 462 in the BQS 124 is used for sending packets back to the GPM 104 for additional main processing 458 or for sending the packets out on the network.

As described above, the distributor 106 allocates to different threads 402 in the PPEs 110 arrival packet processing and main packet processing tasks. For example, the distributor 106 may send allocation commands 464 to a certain subset of threads 402A for arrival processing 452. Similarly, the distributor 106 may send allocation commands 466 to another subset or threads 402B for main packet processing 458.

In one scenario, main processing 458 may become congested (bottlenecked) and stage-1 queuing 462 may start backing up. If necessary, information about queue lengths, or other packet prioritization information determined during arrival processing 452, can be used to make more intelligent packet drop decisions. Thus, the packet processor 100 can avoid dropping high priority packets, control traffic, etc. This allows the packet processor 100 to provide more services without dropping important packet traffic.

The packet processor architecture is particularly novel in allowing packets to first be loaded into the GPM 104, allocated to threads 402 by the distributor 106, and then having the gather mechanism 122 autonomously assemble the packets for queuing in the BQS 124 while threads start processing on new packets. The BQS 124 in combination with the feedback path 132 then provides the unique feature of allowing packets to be re-circulated back to GPM 104 for thread reallocation by the distributor 106.

Figure 9B:
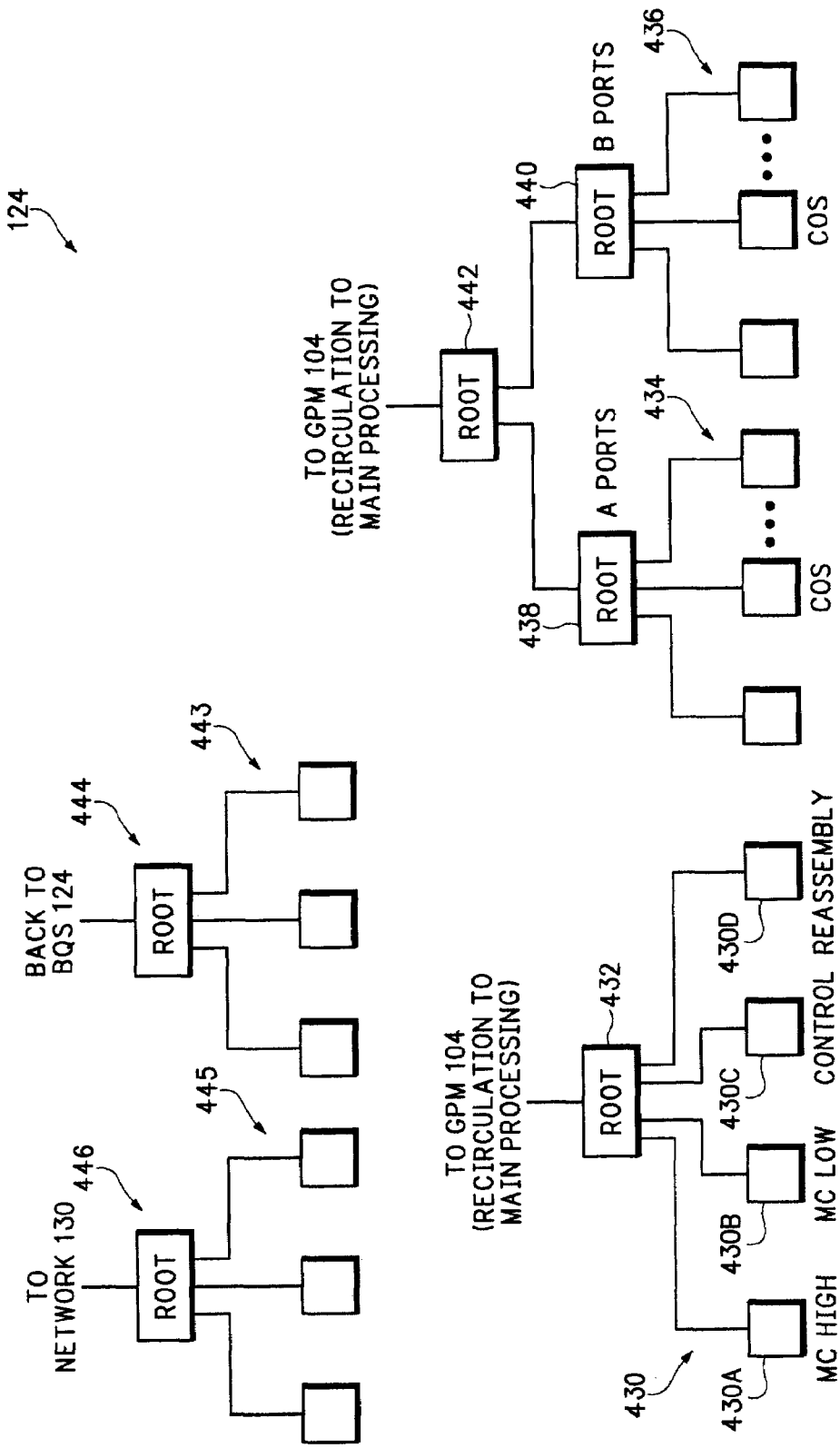

FIG. 9B describes generally how packets are designated for recirculation. The BQS 124 (FIG. 9A) includes different queues that may be associated with different hardware or software operations. For example, multicast packets that need to be re-circulated for additional main processing 458 might be loaded into a high priority multicast queue 430A or a low priority multicast queue 430B. Control packets that need to be re-circulated back to the GPM 104 might be loaded into a control queue 430C and packets requiring reassembly might be loaded into a reassembly queue 430D. The root 432 directs the BQS 124 to re-circulate the packets in queues 430 back to the GPM 104. In one example, a root is defined as an accumulation of queues.

Other queues 434 and 436 may be associated with Cost of Service (Qos) values for different hardware ports. Root 438 for queues 434 may be associated with a first type of input port and root 440 for queues 436 may be associated with a second type of input port. For example, the root 438 may be associated with packets received from gigabit Ethernet ports and root 440 may be associated with packets received from Optical Carrier (OC) 192 ports. Roots 438 and 440 may have an associated root 442 that re-circulates the packets received in queues 434 and 436 after initial arrival processing 452 back to the GPM 104 for main processing 458.

The BQS 124 may also include other queues 445 that have an associated root 446 that is not used for re-circulation but alternatively outputs the associated packets to the network 130 (FIG. 1). Other queues 445 may have an associated root 444 that re-circulates packet directly back to the BQS 124.

The distributor 106 also uses the roots to allocate packets. For example, different sets of PPEs 110 or threads 402 (FIG. 9A) may be assigned to different roots. Either during arrival processing 452 or during main processing 458, a packet can be designated for recirculation simply by assigning the packet to a particular queue in BQS 124 having a recirculation root. At the same time, the packets can also be designated for processing by a particular set of PPEs 110 or threads 402 by assigning the packet to a queue with a recirculation root assigned to a particular set of PPEs or threads. Thus, "rate based" processing that may be performed by the BQS 124 can be intermixed with "processing time" based scheduling performed by the distributor 106.

Intelligent Packet Drops

FIG. 10A shows a conventional packet processor 469 where all processing for a packet is performed during a single processing stage 472. Packets on line 471 may be stored in an arrival queue 470. The packet processor 469 processes the packets and then stores the processed packets in an output queue 474 until they are output onto a network.

The single processing stage 472 has a variable processing time, for example, due to the different packet fragmentation ordering or different packet operations that may be performed on different packets. There may be times when the packet processing stage 472 backs up and causes the packet processor 469 to indiscriminately drop packets 476. For example, the newest arriving packets may be the first packets dropped without taking into account packet priority or packet control status information.

In FIG. 10B, initial bounded rate packet processing operations are performed in arrival processing 452. The fixed rate arrival processing 452 may include, for example, accessing control lists or security policing. Arrival processing 452 can also include checking received packets for an invalid source address, performing Quality of Service (QoS) operations, or determining if the incoming packets contain link control data. In another example, a particular customer may not be authorized to send data above a particular packet rate. The arrival processing 452 may identify incoming packet traffic exceeding previously agreed upon transmit limits.

All of these arrival processing operations 452 require a relatively short, bounded, processing time. This allows the network processor 100 to complete tasks in arrival processing 452 at a relatively fast guaranteed packet processing rate. Thus, it is less likely that packets will be dropped during initial arrival processing 452.

The arrival processing 452 may, if necessary, drop any non-conforming packets 482 before the packets are loaded into stage-1 queuing 456. This reduces packet loading in the BQS 124 and also reduces the load on threads during main processing 458.

When packets do need to be dropped, arrival processing 452 provides the additional advantage of enabling more intelligent packet dropping. For example, from time to time, packets might still overflow in BQS 124. Since more characteristics of the packets have been identified during arrival processing 452, more intelligent packet drop decisions can be made. For instance, arrival processing 452 may identify QoS information for packets stored in BQS 124 and recirculated to GPM 104 for main processing 458. If necessary, packet drop decisions 483 can then be based on the QoS information derived during arrival processing 452.

Load Control

FIGS. 11A and 11B show another example where the recirculation path 132 (FIG. 1) is used for load control. The main processing 458 in FIG. 11A may require tasks with long variable processing times. For example, multicast operations may require duplication of the same packet multiple times. The threads involved with the multicast operations may be tied up for extended periods of time. If most, or all, of the threads are tied up processing multicast packets, there may be insufficient threads for handling other main processing operations and may prevent the allocation of the originally desired resources.

As shown in FIG. 11A, the main processing 458 requires three different multicast operations that each require 16 replications of a multicast packet. FIG. 11B shows how the multicast operations can be limited to eight packet replications for each main processing session 458. If the multicast packet has to be replicated more than 8 times, after the eighth replication, the packet is loaded into a particular queue in BQS 124 designated for recirculation as described above in FIG. 9B. The multicast packet 460 is then recycled over recirculation path 132 back to the GPM 104 for another pass through main processing 458. The remaining 8 packet replications are then performed during a second pass through main processing 458. This allows the threads 402 to complete main processing session 458 in less time, freeing up the threads for other packet processing tasks.

Cache Affinity

There are certain packet processing operations that may promote cache thrashing. Cache thrashing refers to repeatedly having to swap data between a cache and a main memory. This is usually caused by disparate processing operations that all have to be performed on the same packet. Randomly distributing the different packet processing tasks to the PPEs 110 can possibly increase cache thrashing. Especially when the PPEs 110 are multi-threaded and the threads share the same instruction cache. For example, threads may be running different applications, such as different packet protocols. Because each protocol may require different processing steps, substantial thrashing may occur in the instruction cache.

Figure 12A:
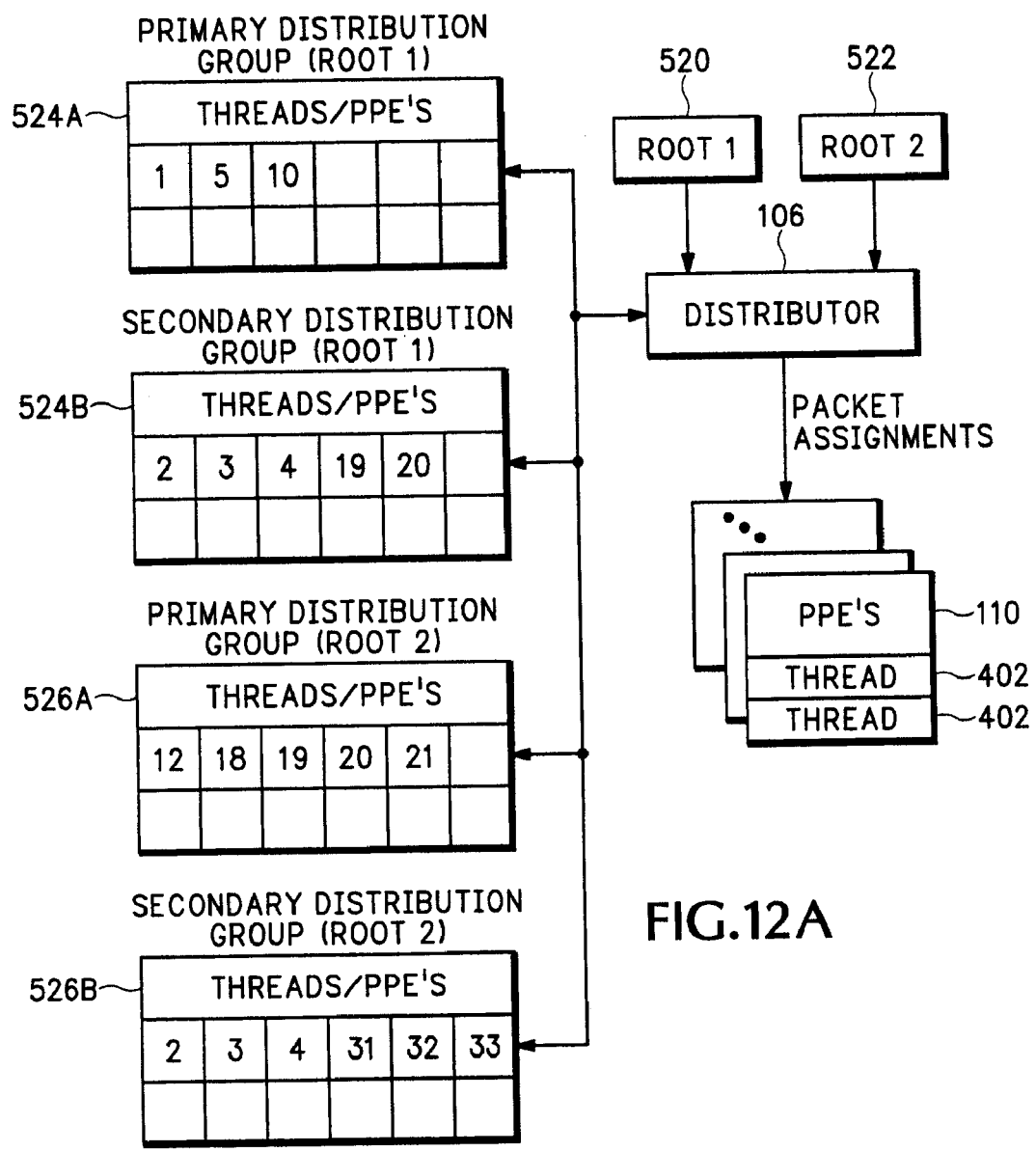
FIGS. 12A and 12B show how distribution groups are used to improve cache affinity.
Figure 12B:
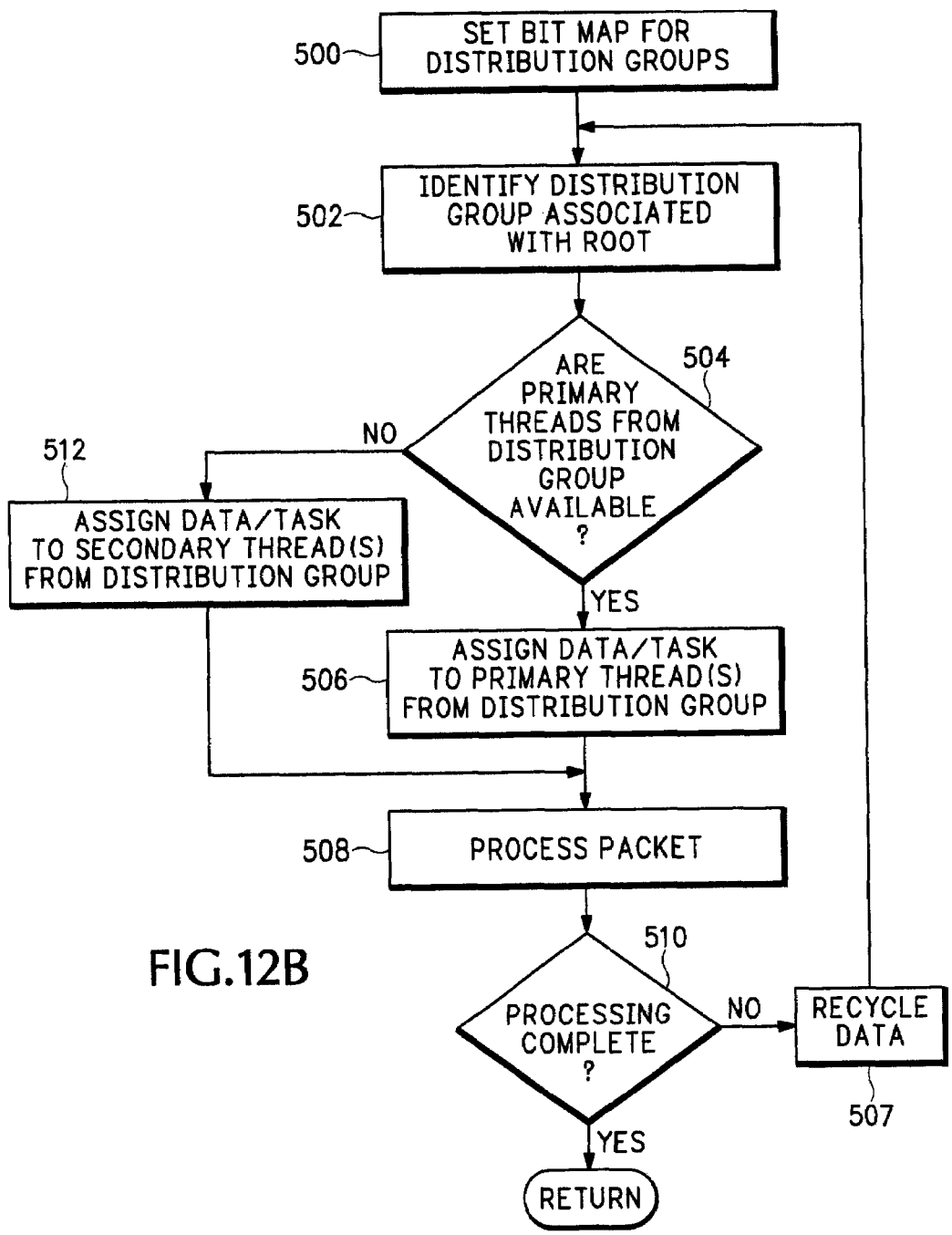

FIGS. 12A and 12B show another aspect of the packet processor that may be used for reducing cache thrashing. Referring to FIG. 12A, a group of threads 402 that all preferentially carry out the same packet processing feature set can be assigned to a same first primary distribution group 524A. For example, all of the threads 402 in the primary distribution group 524A may be designated for tasks associated with one or more of the same packet protocols. In another example, the threads 402 in a distribution group may be assigned to packets received on a particular group of ports. In either case, the threads 402 designated in primary distribution group 524A are all associated with a particular root 520. A secondary distribution group 524B is also associated with root 520 and can be used when none of the threads 402 in the primary distribution 524A are available.

A similar primary distribution group 526A and secondary distribution group 526B are associated with a second root 522. Of course, the number of primary and secondary distribution groups vary depending on the number of roots. In one embodiment, bitmaps are used for identifying the threads in the primary and secondary distribution groups.

Referring to FIG. 12B, the bitmaps for the distribution groups are set in block 500. In block 502, the distributor 106 (FIG. 12A) identifies the primary distribution group for the root associated with the packet. In block 504, the distributor 106 looks for a free thread 402 in the primary distribution group. If one of the threads 402 from the primary distribution group is available, the distributor 106 assigns the processing task or packet to the available thread 402 in block 506. This allows the threads in the primary distribution group to have an affinity for the operations associated with the root. If there is no free threads 402 in the primary distribution group, in block 512, the task is assigned to a thread 402 from the secondary distribution group. The assigned thread 402 from the primary distribution group, or alternatively, the secondary distribution group, then processes the packet in block 508.

In block 510, when additional packet processing is required, the packet data is re-circulated in block 507 back to main processing 458 (FIG. 9A). The distributor 106 then has the same opportunity to assign the packet to another one of the threads 402 from the primary distribution group.

Thus, certain packet processing operations are directed to subsets of threads (affinity group) that are more likely to use the same cache instructions. The threads 402 can also dynamically reconfigure the distribution groups. For example, the threads 402 can change the maps for the distribution groups so that the distributor 106 assigns different threads to a particular root.

A thread might only be assigned to one, or a few, primary distribution groups but may be assigned to significantly more secondary distribution groups. This allows each root to have a primary set of threads to work on tasks. If not all of the threads in the primary distribution group are being used, the available threads 402 in the primary distribution group can be dynamically reassigned to other roots through their associated secondary distribution group.

Multi-Level Memory Mapping

Figure 13:
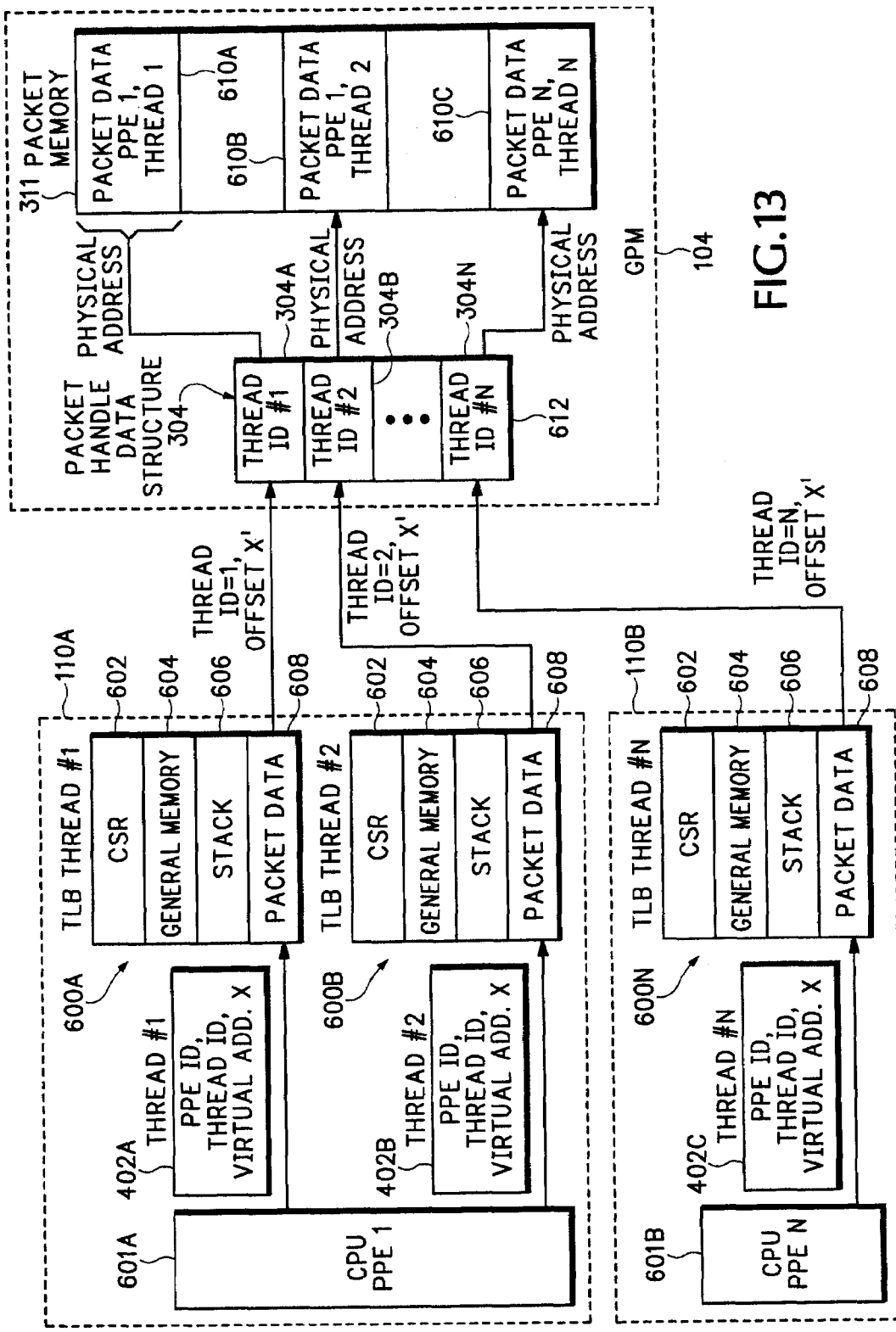
FIGS. 13 and 14 show a dual-level memory map system operating in the packet processor.

FIG. 13 is a logical representation of a multi-level memory mapping feature. A first memory map level, or stage, consists of Translation Look-aside Buffers (TLBs) 600 that map virtual addresses generated by threads 402 to different resources. A second memory map level, or stage, is associated with the identified resource and uses a thread ID to map an address offset generated by the first memory map stage to a particular physical address in the identified resource. In one example, the second memory map stage in the GPM 104 resource is the packet handle data structure 304 previously shown in FIG. 5.

In one embodiment, separate TLBs 600 are provided for each individual thread 402 operated by CPUs 601 in the PPEs 110. The TLBs 600 operate as the first memory map stage by converting a virtual address X generated by the associated thread 402 into an offset value X' that accesses a particular resource in the packet processor 100. The TLBs 600 are shown located in the PPEs 110, but could operate from other functional units in the packet processor 100.

Different entries in the TLBs 600 are associated with different packet processor resources. For example, a Control Status Register (CSR) entry 602 is used by the threads 402 to access a memory resource storing different control and register data. A general memory entry 604 is used for accessing external memory 115 (see FIG. 14), such as an external Dynamic Random Access Memory (DRAM). A stack entry 606 is used for accessing locations in the external memory 115 that in one example store private stack data. A packet data entry 608 is used for accessing packet data stored in the GPM 104.

As previously described above in FIG. 5, the packet handle data structure 300 maps the offset value X' generated by the TLB 600 into a corresponding physical memory space 610 in packet memory 311 associated with the thread ID. This allows each thread 402 to reference a same set of virtual packet addresses O-N but access different physical address spaces 610 in packet memory 311.

For example, FIG. 13 shows a PPE 110A that operates threads 402A and 402B and a PPE 110B that operates thread 402C. Each thread 402A-402C has an associated TLB 600A-600C, respectively. Of course any number of PPEs 110 can reside in the packet processor 100 and any number of threads 402 can be operated by the PPEs 110.

Each thread 402 includes a thread identifier (thread ID) that associates with a corresponding TLB 600. For example, the first thread 402A generates a virtual address X and an associated thread ID value. The thread ID value associates the virtual address X with TLB 600A. The entry 608 in TLB 600A maps virtual address X to an address offset value X' that accesses GPM 104 (resource). The thread ID for thread 402A is used to access an associated packet handle data structure 304A in GPM 104. The packet handle data structure 304A then conducts a second mapping of the address offset X' to a particular physical address region 610A in packet memory 311. As shown in FIG. 5, the packet address region 610A may comprise multiple non-contiguous data segments that contain packet data for a packet assigned to thread 402A.

Similarly, thread 402B is associated with TLB 600B. The TLB entry 608 in TLB 600B may map the same virtual address X generated by thread 402B to a same offset value X' that accesses the same GPM resource 104. However, the thread ID value for thread 402B maps to a second packet handle data structure 304B. The packet handle data structure 304B then conducts a second mapping of the offset value X' to a second physical address region 610B in packet memory 311. Thus, the TLBs 600 in combination with the packet handle data structures 304 map the virtual addresses generated by threads 402 to unique physical memory locations in GPM 104.

Figure 14:
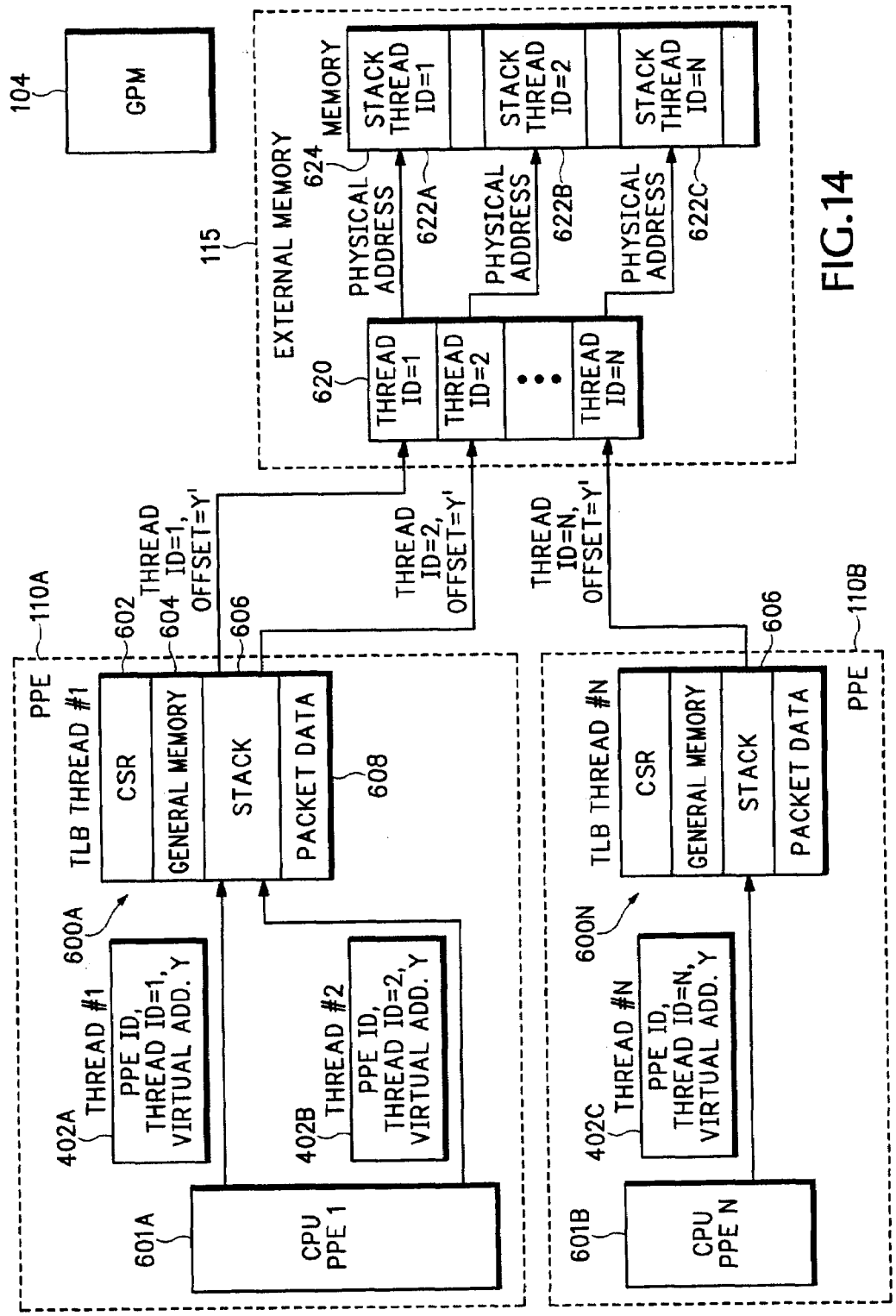

FIG. 14 shows another resource that uses the dual-level memory mapping. In this embodiment, the TLB 600A is shared by both thread 402A and thread 402B. The virtual address Y generated by thread 402A or thread 402B is mapped by stack region 606 to an offset Y' associated with external memory resource 115. Note from FIG. 13, that virtual address X corresponding to packet data entry 608 was mapped to the GPM resource 104. The external memory 115 includes a second memory map 620 that maps the offset value Y' into different physical address locations 622 in memory 624. For example, offset Y' for thread 402A is mapped to physical address region 622A and the same offset Y' for thread 402B is mapped to physical address region 622B.

Thus, the first memory mapping stage maps virtual addresses to different resources and possibly different locations within a particular resource and the second memory mapping stage then maps the offset value generated by the first stage to a particular physical memory location associated with the thread ID.

Co-Processing

Figure 15:
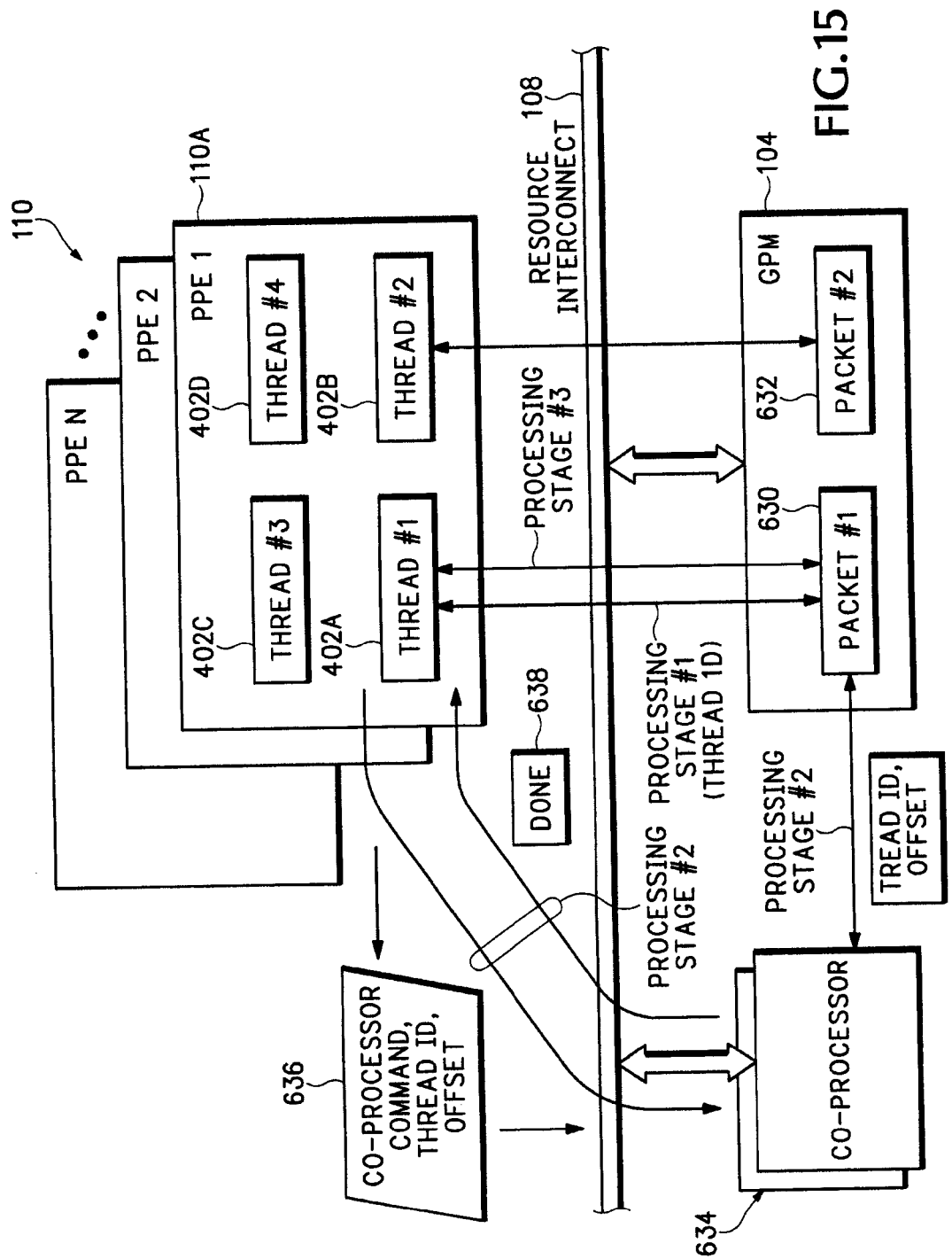
FIG. 15 shows how co-processor packet processing is intermixed with multi-threaded packet processing operations.

FIG. 15 shows one or more co-processor resources 634 that independently access the GPM 104 pursuant by commands issued by the threads 402. This allows thread processing and co-processor processing to be intermixed. In one embodiment, the GPM 104 and co-processor 634 are on the same chip. This allows the co-processor 634 to be directly attached to the GPM 104 without requiring any additional buffering.

The co-processor 634 acts, and is treated, as any other resource by the threads 402. As described above, a resource is any element that receives a command from a thread 402 and sends back a result. For example, the external memory 115 (FIG. 1) is a resource and the GPM 104 is another resource. The combination of the co-processor 634 operating as a resource, the co-processor 634 autonomously accessing packet data in the GPM 104, and the multithreading capability of the PPEs 110, provide improved co-processor operability.

For example, a first thread 402A in a first processing stage starts processing packet 630. As described above in FIG. 13, the thread ID for thread 402A is used in GPM 104 for identifying the packet 630. In a second processing stage, the thread 402A sends a command 636 to the co-processor 634 that includes the thread ID and an offset into packet 630. The co-processor 634 contains an algorithm corresponding with the co-processor command 636. The co-processor 634 uses the thread ID and offset supplied by the thread 402A to access and then start autonomously processing packet 630.

Depending on the software and the packet operation, the thread 402A may continue processing packet 630 in parallel with co-processor 634. While co-processor 634 is processing packet 630, the thread 402A can also start other co-processors 634 that process the same or different packets.

The co-processor 634 sends a notification 638 back to thread 402A when it has completed processing on packet 630. Thread 402A in a third processing stage then completes any additional processing required for packet 630.

Multi-threading in the PPEs 110, in combination with the autonomous operation of the co-processor 634, also allows other threads to run while one thread is possibly stalled waiting for the co-processor 634 to return a result. For example, a second thread 402B can continue, or start processing another packet 632, even if thread 402A is stalled waiting for the co-processor 634 to complete processing on packet 630.

One example of processing performed by the co-processor 634 may include cryptography (crypto) operations. Typically crypto processors are located before conventional packet processors. There are several issues with this type of architecture. For example, packet prioritization may be required before crypto operations. Other pre-filtering or decapsulation operations may also be required prior to the crypto operations. However, other processing operations, such as Multi-Link Point to Point Protocol (MLPPP), may be required after the crypto operations just before the packets are sent out of the packet processor.

As shown above in FIG. 15, crypto processing by the co-processor 634 can easily be intermixed before and after other packet processing performed by the PPEs 110. Thus, the packet processor architecture is more effective at integrating co-processing operations with other general PPE packet processing operations.

In FIG. 15, the PPEs 110 access the co-processor 634 and the GPM 104 through the resource interconnect 108. In an alternative embodiment, the resource interconnect 108 may couple the packet processing elements 110 with the GPM 104 and in parallel couple the co-processor 634 with the GPM 104.

CACHE Hardware Assist

Generally, network processors are not cache coherent. This can create problems if a multi-processor system operates on a run to completion model, where each processor tries to fully process a packet before moving on to another packet. Some multi-processor architectures may handle one piece of a packet, then hand the packet off to another processor. When multiple different processors each do a piece of work on a same packet, there are not as many coherency issues. For example, when each processor conducts the same work on each packet, the same processing states, such as the state of data structures, can typically be maintained within the same processor.

In one embodiment of the packet processor 100, one thread may perform all or most of the work on a packet. If data structures extend across packets, data needs to be efficiently located back into main memory for access by other threads.

Figure 16:
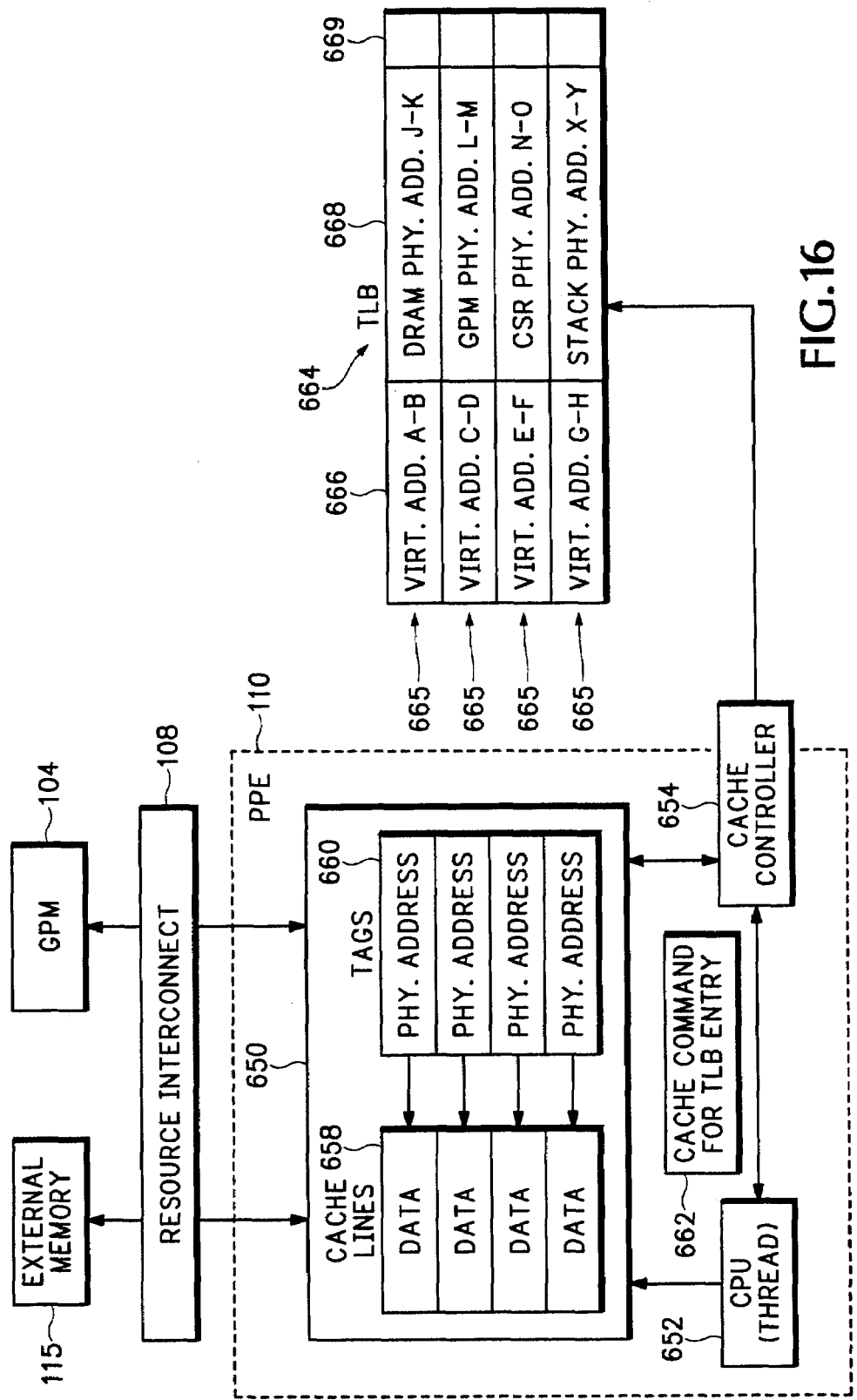
FIGS. 16 and 17 show how cache coherency is improved in the packet processor.

FIG. 16 shows a Translation Look-aside Buffer (TLB) 664 that includes TLB entries 665 accessed by a Central Processing Unit (CPU) 652. The TLB entries 665 include a virtual address range 666, corresponding physical address offsets 668, and possibly an additional control section 669. The control section 669 may used to determine if a physical address is readable, writeable, allocation and memory ordering parameters. Memory accesses can be specified in the TLB as buffered (relaxed order) or non-buffered (write-synchronous strongly ordered).

The TLB 664 maps the virtual addresses 666 to physical address offsets 668 associated with different resources. For example, as described above in FIG. 13, different TLB entries 665 may be associated with different resources such as GPM 104 and external memory 115. Other TLB entries may be associated with particular regions within one of the resources, such as stack region or a CSR region.

A cache 650 includes tags 660 that identify the highest bits of the physical address for data contained in the cache lines 658. In one example, the cache 650 accesses either external memory 115 or on chip GPM 104. The cache lines 658 can be used for instruction data or packet data.

A cache controller 654 is a hardware state machine activated by cache commands 662. The cache controller 654 represents operations that logically may be performed in hardware and/or software. For example an instruction architecture may have a software-controlled TLB 664. The cache controller 654 may handle the normal data cache operations (line allocation, eviction, and memory ordering), as well as page-indexed operations described below.

The CPU 652 sends a single cache command 662 that refers to one of the TLB entries 665. Each TLB entry 665 may have an associated number that is identified in the cache command 662. Pursuant to the cache command 662, the controller 654 performs a cache operation for all the cache lines 658 associated with the TLB entry 665.

Figure 17:
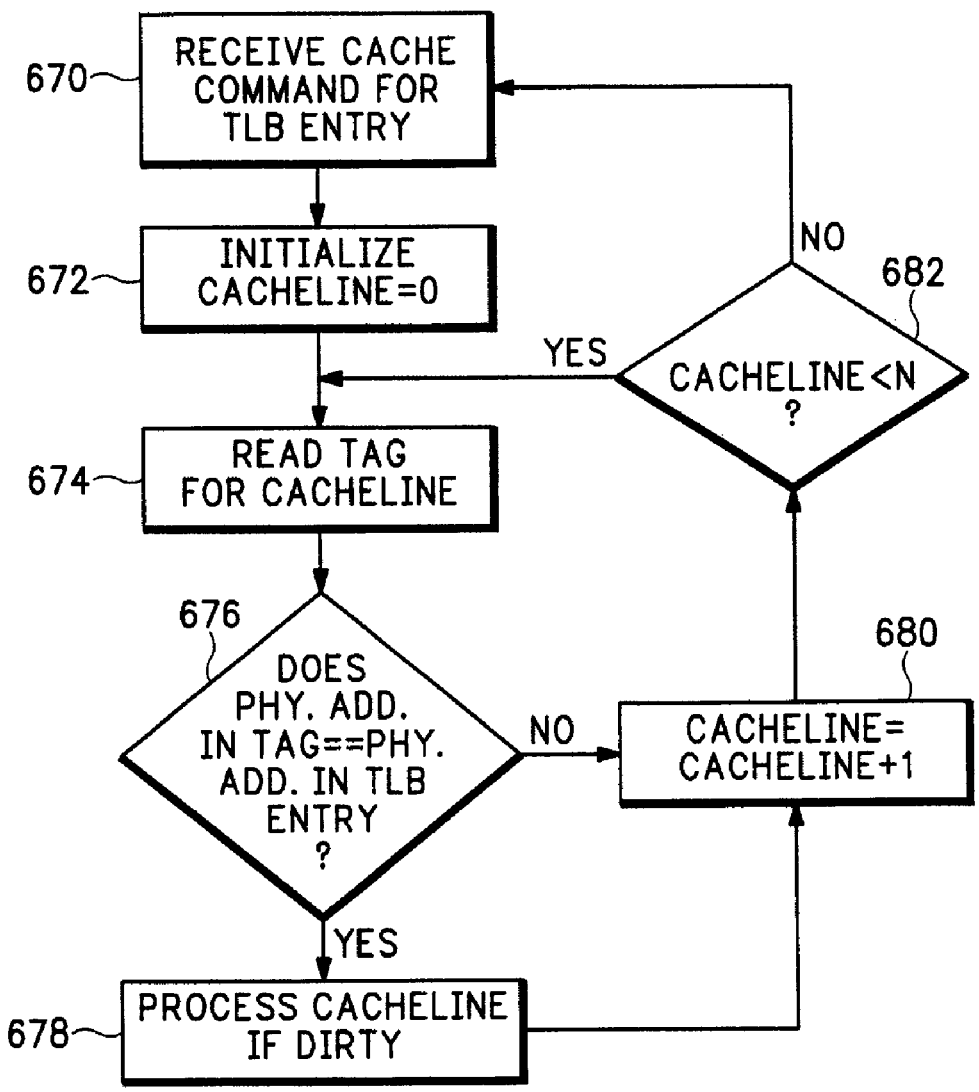

Referring to FIG. 17, in block 670, the controller 654 receives a cache command 662 from the CPU 652 that identifies a particular TLB entry 665. The controller 654 in block 672 initializes itself by setting a variable value to zero (cacheline=0). This effectively points the controller 654 to the first cache line 658 in cache 650. In block 674, the controller 654 reads the physical address in the tag 660 for cacheline=0.

In block 676, the controller 654 compares the physical address in tag 660 with the physical addresses 668 for the TLB entry specified in cache command 662. In one embodiment, the physical address of a cache line is obtained using a multi-cycle operation. In addition, if the cache is set-associative, the cache line variable is partitioned to have a number of way selection bits and a number of set selection bits to map the 2-D cache line array onto an integer counter.

If there is a match in block 676, and if the cache line is dirty, the controller in block 678 performs the cache operation specified in cache command 662. If there is no match, or the cache line is not dirty, the controller 654 increments the variable (cacheline=cacheline+1) in block 680.

The physical address associated with the next cache line 658 is then compared to the physical addresses 668 for the specified TLB entry 665. This process repeats in block 682 until the cache operation in cache command 662 is performed for all the cache lines 658 corresponding with the specified TLB entry 665. Thus, the controller 654 automatically checks all the tags 660 and performs the cache operation on all of the cache lines corresponding with the specified TLB entry pursuant to a single CPU command 662.

The controller 654 can perform different types of cache operations corresponding to different cache commands 662. For example, the cache command 662 can be a flush command that causes the controller 654 to send the contents of the cache lines 658 back to a main memory while the contents in the cache line 658 remains valid. The cache command 662 can also be a flush and invalidate command that causes the controller 654 to store the contents of the cache lines 660 back into the main memory and then invalidates those cache lines.

The TLB cache controller 654 ensures that shared data structures, etc. contained in cache 650 are correctly stored back into memory 115 or 104 and available for use by other threads. This allows software to operate more efficiently under non-coherency conditions. The controller 654 also relieves PPE software from having to manage each cache operation.

Variations

Many variants of the network processor 100 described above can be implemented. For example, packets can be mapped into the virtual or the physical address space of the PPEs 110. The resource interconnect 108 can take any of a number of forms. The caching architecture can take any of a number of forms. The PPEs 110 can implement cache coherency or not. The GPM 104 can be implemented in different ways. The PPEs 110 can have different number of threads and their internal architecture may vary. The BQS 124 may or may not be integrated into the same chip containing the other processing elements, and could be implemented more in hardware or in a more software-intensive manner.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A packet processor, comprising:
an external interface to receive external packets from a network;
a recirculation interface to receive recirculated packets;
a plurality of packet processor elements each operating one or more threads;
a packet memory coupled to the external interface to store the external packets, coupled to the recirculation interface to store the recirculated packets, and coupled to the packet processing elements to enable the packet processor elements to process both the external packets and the recirculated packets;
a distributor distributing ones of the external packets in the packet memory to free ones of the threads according to a bounded time arrival processing required for the external packets, and distributing ones of the recirculated packets in the packet memory to free ones of the threads according to a variable time main processing required for the recirculated packets; and
wherein the arrival processing of the external packets by the packet processor elements is used, at least in part, to produce the recirculated packets.

2. The packet processor according to claim 1 further comprising a queuing system that receives the packets after completing each of the arrival processing and the main processing, the queuing system enabled to store the arrival-processed external packets and the main-processed recirculated packets in a plurality of sets of queues, each of the sets of queues having a respective root.

3. The packet processor according to claim 2 further comprising a recirculation path that re-circulates at least some of the packets in the queuing system back to the packet memory via the recirculation interface.

4. The packet processor according to claim 3 wherein the recirculation path re-circulates packets in the queuing system back to the packet memory for one or more additional passes through the main processing.

5. The packet processor according to claim 3 wherein the main processing partially completes packet replications for a multicast packet, and then sends the multicast packet pack through the recirculation path for another pass through the main processing to continue the packet replications.

6. The packet processor according to claim 2 wherein some of the roots are configured as recycle roots that send the packets in the associated queues back to the packet memory for the main processing by the threads.

7. The packet processor according to claim 6 further comprising, for each of the recycle roots, a respective primary distribution group associated with respective primary ones of the threads, the distributor preferentially using the primary distribution groups to distribute the recirculated packets from the recycle roots to the associated respective primary threads.

8. The packet processor according to claim 7 further comprising, for each of the recycle roots, a respective secondary distribution group associated with respective secondary ones of the threads, the distributor using the secondary distribution groups to distribute the recirculated packets from the recycle roots to the associated respective secondary threads when the associated respective primary threads are not available.

9. The packet processor according to claim 8 wherein the secondary threads overlap into more than one of the secondary distribution groups.

10. The packet processor according to claim 2 further comprising a gather mechanism enabled to gather processed ones of the packets in the packet memory to send to the queuing system while the threads that previously processed the packets are processing new packets.

11. A packet processor, comprising:
an array of packet processing elements, each enabled to operate one or more threads;
a memory system including packet memory to store packets and a packet handle data structure having a plurality of entries, each of the packets in the packet memory associated with a respective one of the packet handle data structure entries;
a distributor coupled to the memory system, the distributor enabled to assign to the threads ones of the packets in the memory system to be processed;
a gather mechanism coupled to the memory system and enabled to use the respective packet handle data structure entries of processed ones of the packets to independently gather and assemble the processed packets to output from the packet memory; and
wherein a first one of the packets associated with a first one of the packet handle data structure entries is assigned to a particular one of the threads by the distributor, the particular thread completes the processing of the first packet, and a second one of the packets associated with a second one of the packet handle data structure entries is assigned to the particular thread by the distributor prior to the gather mechanism using the first packet handle data structure entry to gather the first packet.

12. The packet processor according to claim 11 wherein the distributor assigns the packets to the threads according to a respective type of relatively bounded arrival processing time or variable main processing time required for the packets.

13. The packet processor according to claim 11 wherein the gather mechanism gathers and assembles the processed packets to output to a queuing system.

14. The packet processor according to claim 11 further comprising a queuing system that comprises queues to store the processed packets and a recirculation path that re-circulates queued ones of the processed packets back to the memory system for additional processing by the threads.

15. The packet processor according to claim 14 wherein the queuing system further comprises associated roots of the queues, some of the roots configured to send the queued processed packets back to the memory system over the recirculation path.

16. A packet processor, comprising:
a plurality of packet processing elements to process packets;
a queuing system to store the packets after being processed by the packet processing elements;
a distributor enabled to allocate packets to free ones of the packet processing elements received both from one or more external ports and recirculated via the queuing system;
wherein each of the packet processing elements is enabled to be notified by the distributor after the distributor has allocated one of the packets to the packet processing element;
wherein a particular one of the packet processing elements is enabled to process both ones of the packets received from the external ports and ones of the packets recirculated via the queuing system; and
wherein the queuing system comprises roots and associated queues that store the packets, some of the roots configured as recycle roots that send the packets in the associated queues back to the distributor for reallocation to the packet processing systems.

17. The packet processor according to claim 16 wherein the distributor allocates the packets received from the external ports to ones of the packet processing elements providing arrival processing, and allocates the packets recirculated via the queuing system to ones of the packet processing elements providing main processing.

18. The packet processor according to claim 17 further comprising a recirculation path that recirculates packets in the queuing system back to the distributor to be reallocated to the packet processing elements after completing the arrival processing or the main processing.

19. The packet processor according to claim 17 wherein the arrival processing has a relatively bounded processing time in the packet processing elements, and the main processing has a variable processing time in the packet processing elements.

* * * * *

UNITED STATES PATENT AND TRADEMARK OFFICE
CERTIFICATE OF CORRECTION

PATENT NO.       : 7,551,617 B2
APPLICATION NO.  : 11/054076
DATED            : June 23, 2009
INVENTOR(S)      : Will Eatherton It is certified that error appears in the above-identified patent and that said Letters Patent is hereby corrected as shown below:

Column 16, Line 48, delete "pack" and insert -- back --, therefor.

Signed and Sealed this

Twelfth Day of January, 2010

David J. Kappos
*Director of the United States Patent and Trademark Office*